US006089297A

United States Patent [19]

Shibagaki et al.

[11] Patent Number: 6,089,297

[45] Date of Patent: Jul. 18, 2000

[54] VENEER BONDING APPARATUS, VENEER BONDING METHOD, BONDED VENEERS, AND VENEER TRANSPORTING METHOD

[75] Inventors: Norio Shibagaki; Teruo Fujie; Kenichi Hiraiwa; Masanori Nagai; Kiichi Yamamoto; Matsunaga Tsuruta; Mikio Tsutsui; Katsuhito Okada; Takayuki Yamauchi, all of Obu, Japan

[73] Assignee: Meinan Machinery Works, Inc., Obu, Japan

[21] Appl. No.: 08/895,371

[22] Filed: Jul. 16, 1997

[30] Foreign Application Priority Data

Jul. 18, 1996 [JP] Japan .................................... 8-209006

[51] Int. Cl.[7] ............................ B29C 65/00; B27D 1/00; B27D 5/00

[52] U.S. Cl. .......................... 156/558; 156/546; 156/509; 156/304.5; 156/258; 144/346; 144/352

[58] Field of Search ................................ 156/258, 304.5, 156/264, 257, 266, 157, 159, 544, 546, 516, 509, 558; 144/346, 348, 352

[56] References Cited

U.S. PATENT DOCUMENTS

| | | | |
|---|---|---|---|
| Re. 28,627 | 11/1975 | Clausen et al. | 156/433 |
| 3,324,766 | 6/1967 | Miller et al. | 414/751 |
| 3,445,313 | 5/1969 | Clausen et al. | 144/348 X |
| 3,461,932 | 8/1969 | Shelton et al. | 144/348 X |
| 3,985,169 | 10/1976 | Chow | 156/258 X |
| 4,042,440 | 8/1977 | Hasegawa et al. | 156/304 |
| 4,615,759 | 10/1986 | Ota | 156/558 |
| 4,678,393 | 7/1987 | Mink | 414/751 |
| 4,841,907 | 6/1989 | Otsuka | 156/258 X |
| 4,931,113 | 6/1990 | Feichtmeir et al. | 156/64 |
| 4,945,652 | 8/1990 | Clarke et al. | 34/12 |
| 5,372,168 | 12/1994 | Minami | 144/352 X |
| 5,674,338 | 10/1997 | Parker et al. | 156/304.5 X |
| 5,755,068 | 5/1998 | Ormiston | 52/314 |

FOREIGN PATENT DOCUMENTS

| | | |
|---|---|---|
| 94 13 041 | 11/1994 | Germany . |
| 52-51005 | 4/1977 | Japan . |
| 6-134703 | 5/1994 | Japan . |
| 8-252805 | 10/1996 | Japan . |

OTHER PUBLICATIONS

Patent Abstracts of Japan vol. 018, No. 435 (M–1655), Aug. 15, 1994 & JP 06 134703 A (Meinan Mach Works Inc), May 17, 1994.

Patent Abstracts of Japan vol. 097, No. 002, Feb. 28, 1997 & JP 08 252805 A (Meinan Mach Works Inc), Oct. 1, 1996.

*Primary Examiner*—Richard Crispino
*Assistant Examiner*—Sue A. Purvis
*Attorney, Agent, or Firm*—Armstrong, Westerman, Hattori, McLeland & Naughton

[57] ABSTRACT

An apparatus for and a method of bonding veneers without problems in manufacturing process even if logs, which causes disorder of veneers after dried are used. The veneer bonding apparatus for bonding veneers to each other comprises: a bonding face machining device for machining both end portions of a veneer to be bonded to bonding faces; a bonding agent applying device for applying bonding agent to at least one bonding face of the machined bonding faces; an adjusting device for adjusting a front end bonding face of a succeeding veneer to a rear end bonding face of a preceding veneer such that a face side of the preceding veneer with the applied bonding agent and a backside of the succeeding veneer with the applied bonding agent are flush with each other; and a pressurizing device for pressurizing the adjusted bonding faces to each other.

17 Claims, 28 Drawing Sheets

VENEER BONDING APPARATUS, VENEER BONDING METHOD, BONDED VENEERS, AND VENEER TRANSPORTING METHOD

BACKGROUND OF THE INVENTION

1. Field of the Invention

The present invention relates an apparatus for and a method of bonding veneer sheets to manufacture sheet material such as plywood, LVL, and LVB, and more particularly to a veneer bonding device and a veneer bonding method with a veneer lathe or the like after the veneer sheets which are cut off from a log are dried, and before the veneer sheets cut off from a log are dried, that is, the veneer sheets are so-called unseasoned (hereinafter referred to as "unseasoned veneers").

2. Description of the Related Art

Conventionally, when manufacturing sheet material such as plywood, LVL, and LVB, at first, unseasoned veneers, which are cut off from a log with a veneer lathe or the like, are dried, and then the dried veneer sheets (hereinafter referred to as "dried veneers") are bonded to provide bonded veneer sheets (hereinafter referred to as "bonded veneers") to manufacture the above-mentioned sheet material.

SUMMARY OF THE INVENTION

In the conventional veneer bonding method described above, in some kinds of logs, twist, disorder, and warp (hereinafter generally merely referred to as "disorder") occur when unseasoned veneers are dried, so that those kinds of logs cannot be used for the following reasons.

Firstly, the disorder of the veneers causes the veneers to be transported abnormally for instance, resulting in a problem in manufacturing process. Further, the disorder causes the machining of bonding faces of the veneers, before the veneers are bonded to each other, not to be carried out accurately, thus involving clearance or overlap between the veneers.

Still further, due to the disorder of the veneers, the bonded faces apart from each other for instance, resulting in poor quality of the bonded veneers.

In addition to the above, even if bonded veneers can be manufactured with those veneers, products made of those disordered bonded veneers have disorder in themselves due to the disorder of the respective veneers, which lowers the value of the products.

Consequently, only good logs which scarcely cause disorder of veneers after dried are used at present. However, not only those good logs are expensive, but also woods are cut for those good logs, so that there is a problem that the resource of those good logs are limited.

It is therefore an object of the present invention to provide an apparatus for and a method of bonding veneers without problems in manufacturing process even if such logs as would cause disorder of veneers after dried, are used.

Further, in case that a conventional veneer bonding machine is used to manufacture bonded veneers, there is a problem that has to be solved in a processing of the first one of veneers which are fed to the veneer bonding machine.

That is, when a veneer fed to the veneer bonding machine is the first veneer, there is no preceding one that has to be bonded to the first veneer. Therefore, a veneer corresponding to the preceding one is to be set to a bonding position by manual operation for the first bonding operation.

Further, when the thickness and width of the bonded veneers are changed, a veneer corresponding to the first veneer which is fed after the change is to be prepared in the same manner described above.

It is therefore another object of the present invention to provided a method of transporting a veneer to a position where the veneer is to be bonded to the succeeding veneer, even if there is no veneer corresponding to the first veneer is provided in advance.

To accomplish the above-mentioned objects, a veneer bonding apparatus for bonding veneers to each other according the present invention comprises: a bonding face machining device for machining both end portions of a veneer to be bonded to bonding faces; a bonding agent applying device for applying bonding agent to at least one bonding face of the machined bonding faces; an adjusting device for adjusting a front end bonding face of a succeeding veneer to a rear end bonding face of a preceding veneer such that a face side of the preceding veneer with the applied bonding agent and a backside of the succeeding veneer with the applied bonding agent are flush with each other; and a pressurizing device for pressurizing the adjusted bonding faces to each other.

Further, an unseasoned veneer bonding apparatus for bonding veneers to each other according to the present invention comprises: a bonding face machining device for machining both end portions of an unseasoned veneer to be bonded to bonding faces; a drying device for drying the machined bonding faces; a bonding agent applying device for applying thermosetting bonding agent to at least one bonding face of the dried bonding faces; an adjusting device for adjusting a front end bonding face cf a succeeding unseasoned veneer to a rear end bonding face of a preceding unseasoned veneer such that a face side of the preceding unseasoned veneer with the applied thermosetting bonding agent and a backside of the succeeding unseasoned veneer with the applied thermosetting bonding agent are flush with each other; and a pressurizing device for heating and pressurizing the adjusted bonding faces to each other.

Still further, a veneer bonding apparatus for bonding veneers to each other according to the present invention comprises: a veneer feeding device for feeding a veneer to be bonded to a following process while nipping the veneer; a bonding face machining device for machining both end portions of the veneer to bonding faces after the veneer feeding device nips the veneer; a veneer transporting device for independently nipping the veneer of which both ends are machined to the bonding faces while the veneer is nipped by the veneer feeding device, and after the nipping of the veneer by the veneer feeding device is released, the veneer transporting device transporting the veneer while nipping the veneer; a bonding agent applying device for applying bonding agent to at least one bonding face of the machined bonding faces; an adjusting device for adjusting a front end bonding face of a succeeding veneer to a rear end bonding face of a preceding veneer such that a face side of the preceding veneer with the applied bonding agent, and a backside of the succeeding veneer with the applied bonding agent are flush with each other; a pressurizing device for pressurizing the adjusted bonding faces to each other; and a bonded veneers transporting device for nipping a train of the bonded veneers, and for transporting the rear end bonding faces of the train of the bonded veneers to a bonding position of the pressurizing device to prepare for bonding to the front bonding faces of the succeeding veneers after the pressurizing device releases the nipping of the train of the bonded veneers.

Further, a veneer bonding apparatus for bonding unseasoned veneers to each other according to the present invention comprises: a veneer feeding device for feeding an unseasoned veneer to be bonded to a drying device in a following process while nipping the veneer; a bonding face machining device for machining both end portions of the unseasoned veneer to bonding faces after the veneer feeding device nips the unseasoned veneer; a drying device for independently nipping the unseasoned veneer and drying the machined bonding faces while the unseasoned veneer of which both ends are machined to bonding faces is nipped by the veneer feeding device; a veneer transporting device for independently nipping the unseasoned veneer while the veneer is nipped at least by the drying device, and after the nippings of the unseasoned veneer by the veneer feeding device and by the drying device are released, the veneer transporting device transporting the unseasoned veneer while nipping the unseasoned veneer; a bonding agent applying device for applying thermosetting bonding agent to at least one bonding face of the dried bonding faces; an adjusting device for adjusting a front end bonding face of a succeeding veneer to a rear end bonding face of a preceding veneer such that a face side of the preceding veneer with the applied thermosetting bonding agent and a backside of the succeeding veneer with the applied thermosetting bonding agent are flush with each other; a pressurizing device for pressurizing the adjusted bonding faces to each other; and a bonded veneers transporting device for nipping a group of the bonded unseasoned veneers, and for transporting the rear end bonding faces of the group of the bonded unseasoned veneers to a bonding position of the pressurizing device to prepare for bonding to the front bonding faces of the succeeding unseasoned veneers after the pressurizing device releases the nipping of the train of the bonded unseasoned veneers.

Still further, bonded veneers made by bonding veneers to each other according to the present invention characterized in that both end portions of the each veneer to be bonded are machined such that shapes of end faces are symmetrical about a straight line in a direction of a thickness of the veneer which passes through centers of parallel sides of the end face which is in parallel to a direction that the veneer is bonded, and the veneers are bonded after the bonding faces are adjusted such that a face side of a veneer and a backside of the other veneer to be bonded are flush with each other.

In the bonded veneers according to the present invention, the shape to be symmetrical may be an isosceles trapezoid of which lower side is on the face side of the veneer.

Further, in the bonded veneers according to the present invention, the shape to be symmetrical can be an isosceles trapezoid of which lower side is on the backside of the veneer.

Further, bonded veneers made by bonding veneers to each other according to the present invention characterized in that both end portions of the each veneer to be bonded are machined such that shapes of end faces are symmetrical about a straight line perpendicular to a direction of a thickness of the veneer which passes through centers of parallel sides of the end face which is in parallel to a direction that the veneer is bonded, and the veneers are bonded after the bonding faces are adjusted such that a face side of a veneer to be bonded and a backside of the other veneer to be bonded are flush with each other.

Still further, bonded veneers made by bonding veneers to each other according to the present invention, both end portions of the each veneer to be bonded are machined such that shapes of end faces are symmetrical about an intersecting point of diagonal lines of an end face which is in parallel to the bonding direction of the veneer, and the veneers are bonded after the bonding faces are adjusted such that a face side of a veneer to be bonded and a backside of the other veneer to be bonded are flush with each other.

In the bonded veneers according to the present invention, the shape to be symmetrical may be a parallelogram.

In the aforementioned bonded veneers according to the present invention, the veneers to be bonded may be unseasoned veneers.

Further, a method of transporting, with the veneer bonding apparatus as claimed in claim 3, a first veneer when veneers with substantially constant thickness in a direction that the veneers are bonded according to the present invention, comprises the steps of: machining both end portions of the veneer to bonding faces with the veneer nipped by the veneer feeding device; independently nipping the veneer of which both ends are machined to the bonding faces by the veneer transporting device while the veneer is nipped by the veneer feeding device, and after the nipping of the veneer by the veneer feeding device is released, the veneer transporting device transporting the veneer while nipping the veneer; pressurizing a portion of a front end bonding face by the pressurizing device when the front bonding face of the veneer is transported to a bonding position of the pressurizing device releasing the nipping of the veneer by the veneer transporting device, and after retreating a predetermined distance the veneer transporting device nipping the veneer again; transporting the front end bonding face by the veneer transporting device to a position where the bonded veneers transporting device is capable of nipping the front bonding face when the pressurizing device releases the nipping of the veneer; and transporting the rear end bonding face of the veneer by the bonded veneers transporting device while nipping the veneers to a bonding position of the pressurizing device to prepare for a bonding to the front end bonding face of a succeeding veneer when the veneer transporting device releases the nipping of the veneer after the bonded veneers transporting device nips the veneers.

In the method of transporting described above it is possible to further include the step of applying bonding agent, by the bonding agent applying device, only to a rear bonding face of the machined bonding faces.

A method of transporting, with the veneer bonding apparatus as claimed in claim 4, a first veneer when veneers with substantially constant thickness in a direction in which the veneers are bonded according to the present invention, comprises the steps of: machining both end portions of the unseasoned veneer to bonding faces with the unseasoned veneer nipped by the veneer feeding device; independently nipping the unseasoned veneer of which both ends are machined to the bonding faces by the drying device while the veneer is nipped by the veneer feeding device; independently nipping the unseasoned veneer by the veneer transporting device while the unseasoned veneer is nipped at least by the drying device; transporting the unseasoned veneer while nipping the unseasoned veneer after the nippings of the veneer by the veneer feeding device and by the drying device are released; pressurizing a portion of a front end bonding face by the pressurizing device when the front bonding face of the unseasoned veneer is transported to is bonding position of the pressurizing device; releasing the nipping of the unseasoned veneer by the veneer transporting device, and after retreating a predetermined distance the veneer transporting device nipping the unseasoned veneer again; transporting the front end bonding face by the veneer transporting device to a position where the bonded veneers transporting device is capable of nipping the front bonding face when the pressurizing device releases the nipping of the unseasoned veneer; and transporting the rear end bonding face of the unseasoned veneer by the bonded veneers transporting device while nipping the veneers to a bonding position of the pressurizing device to prepare for a bonding to the front end bonding face of a succeeding veneer when the veneer transporting device releases the nipping of the veneer after the bonded veneers transporting device nips the unseasoned veneers.

Further, in the method of transporting a first veneer when veneers with substantially constant thickness in a direction in which the unseasoned veneers are bonded, it is possible to further include the step of applying thermosetting bonding agent, by the bonding agent applying device, only to a rear bonding face of the machined bonding faces.

A method of bonding veneers according to the present invention comprises the steps of: machining both end portions of each of the veneers to bonding faces; applying bonding agent to at least one bonding face of the bonding faces; adjusting the bonding faces such that a face side of a veneer to be bonded and a backside of the other veneer to be bonded are flush with each other; and pressurizing the adjusted bonding faces to each other to bond the veneers to each other.

In the above-mentioned method of bonding veneers according to the present invention, the veneers to be bonded may be unseasoned veneers.

Further, a method of bonding veneers according to the present invention comprises the steps of: machining both end portions of each of the unseasoned veneers to bonding faces; drying the bonding faces and applying thermosetting bonding agent at least one bonding face of the dried bonding faces; adjusting the bonding faces of each of the unseasoned veneers such that a face side of a unseasoned veneer to be bonded and a backside of the other unseasoned veneer to be bonded are flush with each other; and heating and pressurizing the adjusted bonding faces to each other to bonded the unseasoned veneers to each other.

In the above-mentioned method of bonding veneers according to the present invention, both end portions of each of the each veneer may be machined such that shapes of end faces are symmetrical about a straight line in a direction of the thickness of the veneer which passes through centers of parallel sides of the end face which is in parallel to a direction that the veneer is bonded.

Further, in the method of bonding veneers according to the present invention, the shape to be symmetrical can be an isosceles trapezoid of which lower side is on the face side of the veneer.

In the method of bonding veneers according to the present invention described above, the shape to be symmetrical can be an isosceles trapezoid of which lower side is on the backside of the veneer.

Still further, in the method of bonding veneers according to the present invention, both end portions of the each veneer to be bonded are machined such that shapes of end faces are symmetrical about a straight line perpendicular to a direction of the thickness of the veneer which passes through centers of parallel sides of the end face which is in parallel to a direction that the veneer is bonded.

In the aforesaid method of bonding veneers according to the present invention, both end portions of the each veneer to be bonded may be machined such that shapes of end faces are symmetrical about an intersecting point of diagonal lines of an end face which is in parallel to the bonding direction of the veneer.

In the above-mentioned method of bonding veneers according to the present invention, the shape to be symmetrical can be a parallelogram.

With the present invention described above, even if the veneers to be bonded are subject to disorder, the disorders of the veneers work negative to each other, which causes bonded veneers to have little disorder.

Further, even if unseasoned veneers which has little disorder before dried but subject to disorder after dried, are dried after bonded to each other, the disorders which are to be generated on each of the veneers work negative to each other, which causes bonded veneers to have little disorder in the same manner described above.

Further, with the present invention described above, after the bonding faces are dried, to the bonding faces is applied thermosetting bonding agent, and then the both bonding faces are adjusted to be heated and pressurized, therefore, in comparison to the case that unseasoned veneers are bonded to each other with the bonding faces are not dried, the present invention provides considerably improved workability and productivity.

Still further, with the above-mentioned present invention, a machining method is selectable to bond veneers to each other in accordance with the characteristic of the cut veneer itself and the condition of disorder of the veneer, resulting in bonded veneers with improved bonding accuracy.

Further, with the present invention described above, even if a veneer corresponding to the first veneer to be fed is not prepared in advance, the first veneer fed to the apparatus may automatically be transported to the bonding position to prepare for the bonding to the succeeding veneer.

BRIEF DESCRIPTION OF THE DRAWINGS

The present invention will be more apparent from the ensuring description with reference to the accompanying drawing wherein:

FIGS. 11 to 22 are schematic cross-sectional side views of the veneer transporting device, the adjusting device, a pressurizing device, a bonded veneer transporting device, a regular cutting device and the like;

DETAILED DESCRIPTION OF PREFERRED EMBODIMENTS

Embodiments of the present invention will be explained with reference to drawings.

Figure 1:
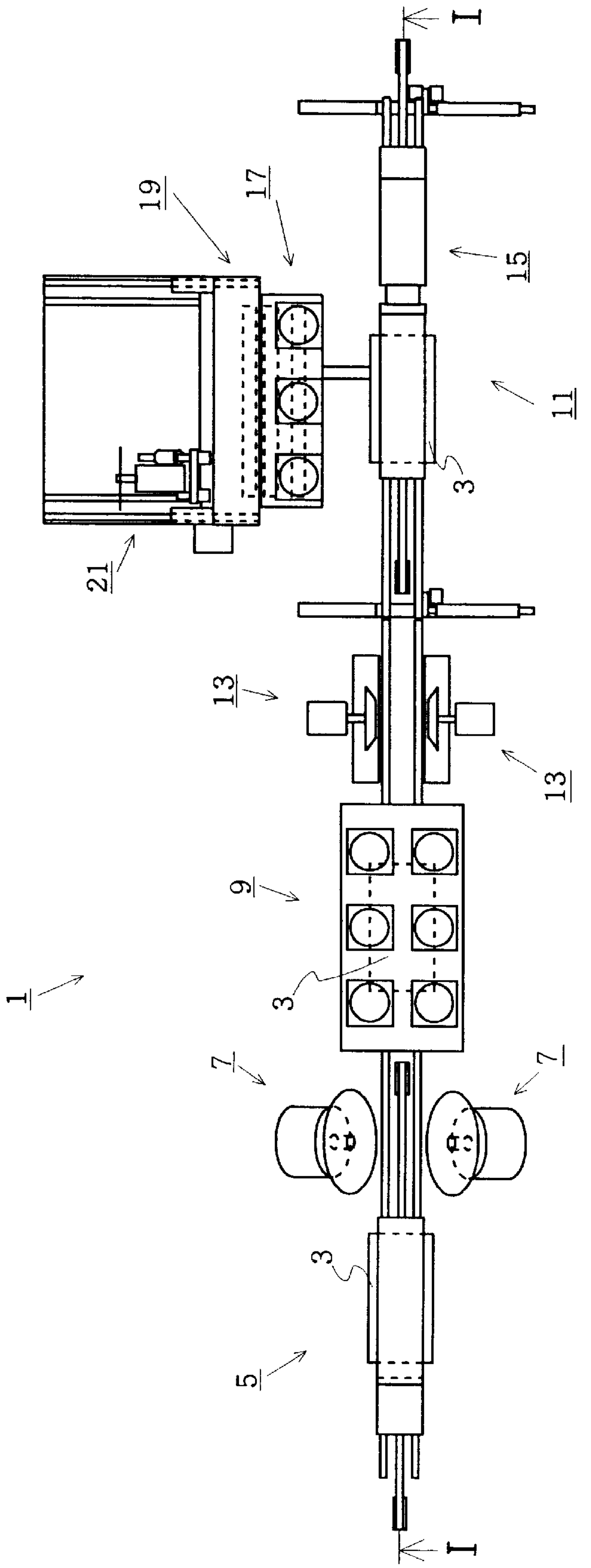
FIG. 1 is a schematic plan view of a veneer bonding apparatus.
Figure 2:
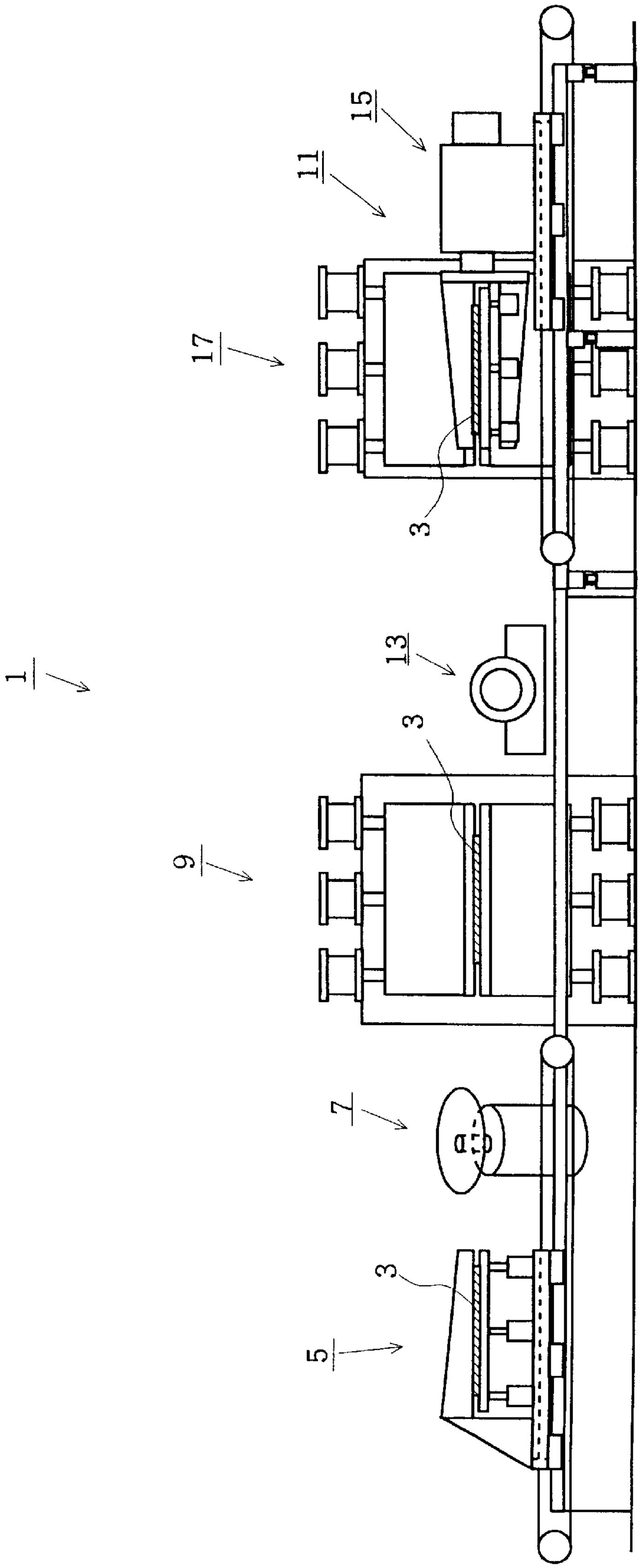
FIG. 2 is a schematic cross-sectional front view of the a veneer bonding apparatus taken alone the line A—A in FIG. 1.

Firstly, in the embodiments of the present invention, an apparatus for and a method of bonding veneers to each other will be explained. FIG. 1 is a schematic plan view for the explanation, and a cross-sectional view taken along the line A—A in the figure is illustrated in FIG. 2 as a schematic plan cross-sectional view.

Hereinafter, following drawings are illustrated with devices in the system omitted, simplified, or changed in their dimensions to an extent that the understanding of the embodiments of the present invention is facilitated.

Numeral 1 is a veneer bonding apparatus for bonding unseasoned veneers 3 to each other.

The veneer bonding apparatus 1 comprises: a veneer feeding device 5 for transporting the unseasoned veneers 3 while nipping the unseasoned veneers 3 to a drying device described below in the following process;

- a bonding face machining device 7 for machining both end portions of the unseasoned veneer 3 which are in parallel to a direction that the unseasoned veneers 3 are transported while the veneer feeding device 5 nips the unseasoned veneer 3;
- the drying device 9 for drying the machined bonding face of the unseasoned veneer 3 while nipping the unseasoned veneer 3 while the veneer feeding device 5 nips the unseasoned veneer 3 of which both end portions are machined to be the bonding faces;
- a veneer transporting device 11 for nipping the unseasoned veneer 3 while the drying device 9 nips the unseasoned veneer 3, and for transporting the unseasoned veneer 3 to a pressurizing device described below in the following process after the nipping of the unseasoned veneer 3 by the drying device 9 is released;
- a bonding agent applying device 13 for applying thermosetting bonding agent to the bonding face of at least one veneer which is dried while being nipped by the veneer transporting device 11;
- a bonding face adjusting device for adjusting a front end bonding face of a succeeding veneer to a rear end bonding face of a preceding unseasoned veneer in such a manner that the face side of the preceding unseasoned veneer and the backside of the succeeding unseasoned veneer are flush with each other;
- the pressurizing device 17 for bonding the adjusted bonding faces to each other through heating and pressurizing;
- a bonded veneers transporting device 19 for nipping the unseasoned veneers 3 (not shown) which are bonded by the pressurizing device 17, and for transporting the unseasoned veneers 3 to the bonding position of the pressurizing device 17 for the bonding of the rear bonding face of the unseasoned veneer 3 to the front bonding face of the succeeding veneer after the nipping of the unseasoned veneer 3 by the pressurizing device 17 is released; and
- a regular cutting device 21 for cutting the bonded veneer to a predetermined length.

Figure 3A:
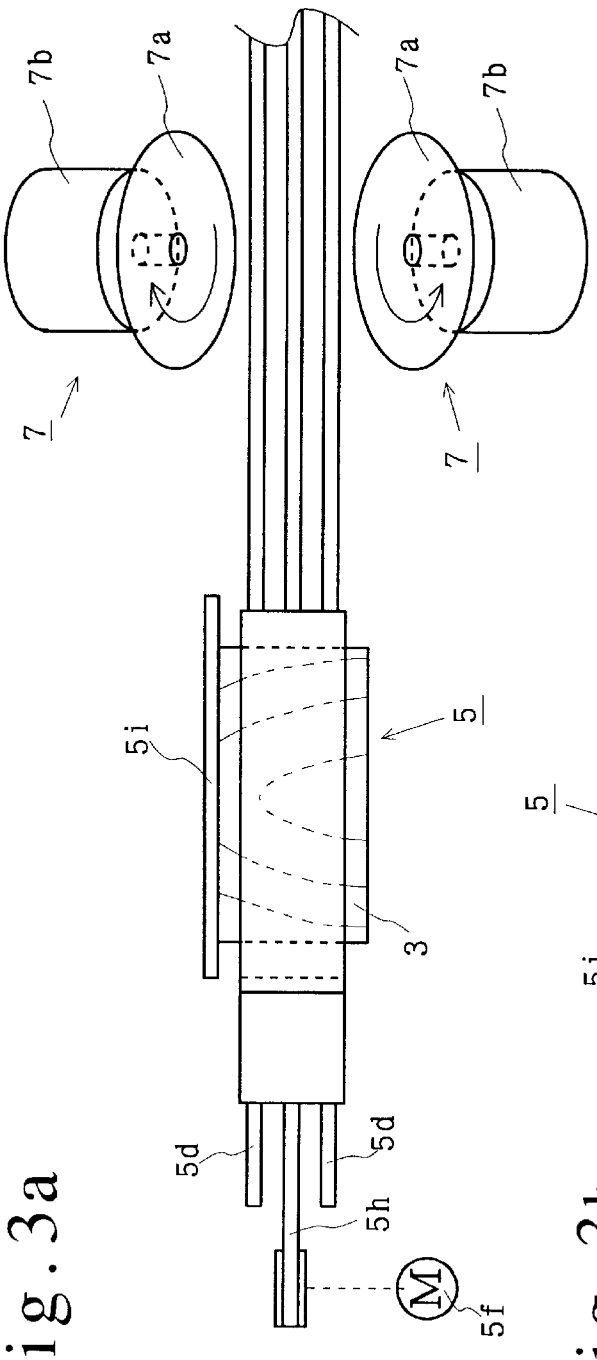
FIGS. 3*a* and 3*b* are a plan view and a front view for explaining a veneer feeding device and a bonding face machining device.
Figure 3B:
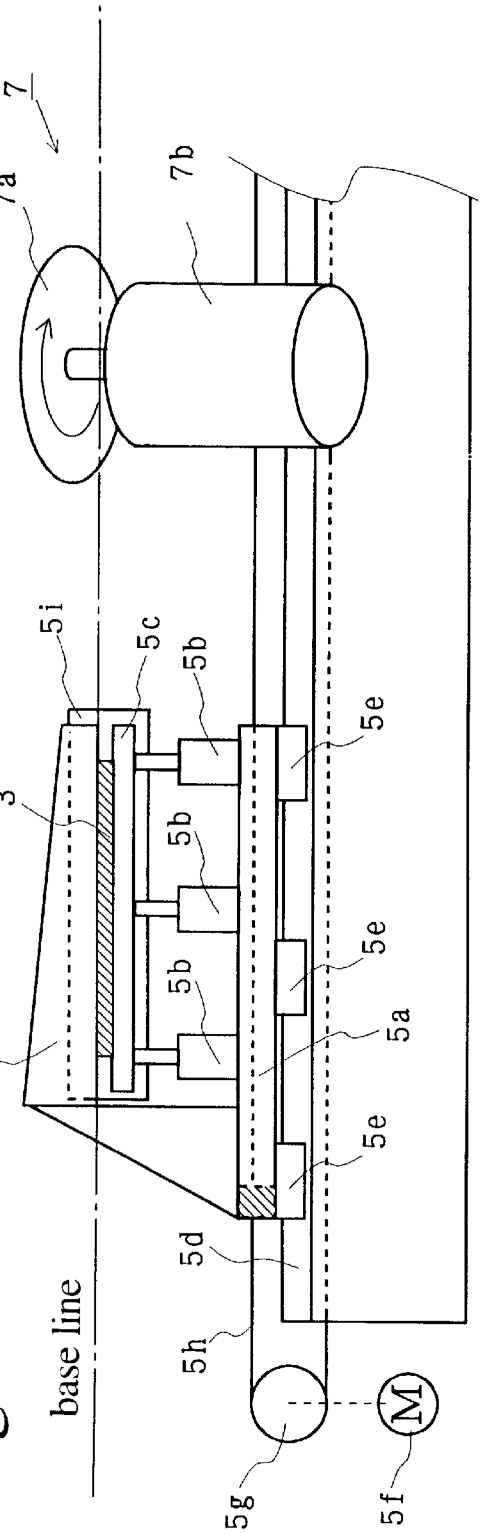

FIG. 3 is a plan view for explaining the veneer feeding device 5 and the bonding face machining device 7.

In the embodiments of the present invention, explanation will be made in case that the unseasoned veneers 3 are bonded in a direction of fibers of the unseasoned veneer 3, that is, in case of the bonding along the grain.

At first, the veneer feeding device 5 is provided on a base 5*a* thereof with a holding surface table 5*j*, and a veneer supporting plate 5*c* which is vertically movable through cylinders 5*b*. Further, the base 5*a* is supported on route stands 5*d* (hereinafter referred to as "rails") through translational bearings 5*e* (hereinafter referred to as mere "bearings"), and further the base 5*a* is movable along the rails 5*d* via a driving belt 5*h* which is connected to and fixed to the base 5*a* through a pulley 5*g* receiving driving force from a motor 5*f*.

Consequently, after the unseasoned veneer 3, which is inserted manually or automatically, abuts a supporting scale 5*i* and is positioned thereto, the veneer supporting plate 5*c* is elevated through the cylinders 5*b* to press the unseasoned veneer 3 to the holding surface table 5*j*, which causes the unseasoned veneer 3 to be supported and secured to the holding surface table 5*j*.

As clearly understood from the drawings, a face of the holding surface table 5*j* which contacts the upper surface of the unseasoned veneer 3 is defined as a base plane of transportation, and the position of the plane becomes a base line of transportation (referred to as merely "base line" in drawings) at the time of transportation of the unseasoned veneer 3. Therefore, in the veneer bonding apparatus 1 according to the embodiments of the present invention, the unseasoned veneer 3 and the bonded unseasoned veneer 3 are transported along the base line of transportation.

When the unseasoned veneer 3 is supported and secured in such a manner described above, the veneer feeding device 5 starts transportation of the unseasoned veneer 3 along the route stand 5*d* to the bonding face machining device 7.

The bonding face machining device 7 is provided with a motor 7*b* and a circular saw 7*a* which is rotated by the motor 7*b*. The bonding face machining devices 7 are installed so as to inwardly tilt toward the both ends of the route stand 5*d* as illustrated in the figure, so that the circular saw 7*a* is able to machine the both end faces of the unseasoned veneer 3, which are in parallel with a direction in which the unseasoned veneer 3 is transported, to bonding faces with a shape of scarf (hereinafter merely referred to as "scarf-shaped bonding faces"). The direction in which the circular saw 7*a* works is set to be a direction into which tips of blades (not shown) of the circular saw 7*a* cut the unseasoned veneer 3 from the lower surface to the upper surface thereof. Therefore, when the unseasoned veneer 3, which is supported and secured by the veneer feeding device 5, is linearly fed toward the bonding face machining device 7, the machining of the unseasoned veneer 3 at the both sides thereof is started, and further feeding of the unseasoned veneer 3 allows the scarf-shaped faces to be completely formed.

The scarf-shaped faces machined at that moment are machined in such a manner that the upper surface of the unseasoned veneer 3 becomes a tip portion of the scarf.

Figure 4:
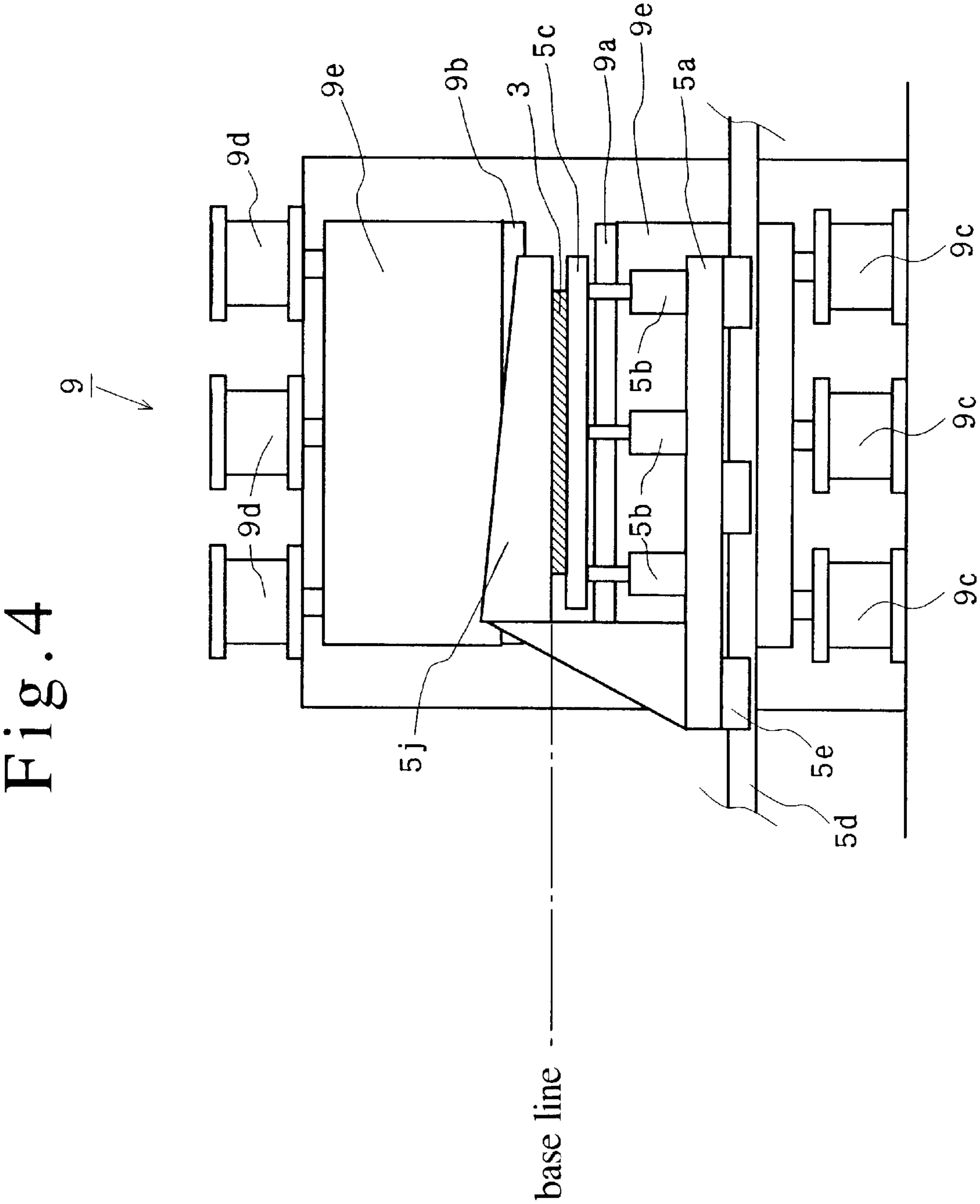
FIG. 4 is a cross-sectional front view for explaining the delivery of a veneer from the veneer feeding device to a drying device.

FIG. 4 is a cross-sectional plan view for explaining the delivery of the unseasoned veneer 3 from the veneer feeding device 5 to the drying device 9.

The drying device 9 is provided with a lower hot plate 9*a* and an upper hot plate 9*b* for pressurizing the scarf-shaped bonding face from upside and downside respectively while heating the face for drying; a lower cylinder for vertically movably driving the lower hot plate 9*a*; an upper cylinder 9*d* for vertically movably driving the upper hot plate 9*b*; reinforcing members 9*e* for connecting the both hot plates and the cylinder with each other and for preventing the disorder of the hot plates which may occur when the bonding faces are pressurized. They are not illustrated, however, the hot plates 9*a* and 9*b* are provided with pipings to supply heat source from the pipings to each of the hot plates through vapor.

Now then, the unseasoned veneer 3 having the machining of the bonding faces thereof completed is transported to the drying device 9 through the veneer feeding device 5. At that moment, the lower hot plate 9*a* and the upper hot plate 9*b* stand by at positions far from the base line of transportation of the unseasoned veneer 3. The purpose of the above-mentioned construction is to prevent the contact of the unseasoned veneer 3 and each of the hot plates with each other even if the transported unseasoned veneer 3 has disorder therein.

Next, after the unseasoned veneer 3 is transported between the upper and lower hot plates, firstly, all lower cylinders 9*c* are driven to elevate the lower hot plate 9*a*. Then, the lower hot plate 9*a* stops at the moment that the lower hot plate 9*a* contacts the lower face of the unseasoned veneer 3. This is because the vertical dimension of the lower hot plate 9*a* is determined so as to contact the lower surface of the unseasoned veneer 3 at the moment that the lower cylinder is extremely elevated. As a result, in case that the thickness of the unseasoned veneer 3 is changed or the shape of the scarf-shaped bonding faces are changed, the shape of the lower hot plate 9*a* should be changed so as to be suitable for those changes.

Next, all upper cylinders 9*d* excluding the central cylinder are driven to lower the upper hot plate 9*b*. Then, the upper hot plate 9*b* stops when the upper hot plate 9*b* reaches the upper surface of the unseasoned veneer 3 to pressurize and heat the bonding faces. This is because the press force of the upper hot plate is smaller than that of the lower hot plate, so that it is impossible to depress the lower hot plate 9*a* not in service at the position where the lower cylinder is elevated to its highest level.

Further, at that moment, the unseasoned veneer 3 is continuously supported and secured through the veneer feeding device 5.

Next, lowering of the cylinder 5*b* of the veneer feeding device 5 allows the supporting and securing of the unseasoned veneer 3 and the veneer supporting plate 5*c* to be released. At that time, even if the supporting and securing of the unseasoned veneer 3 and the veneer feeding device 5 are released, the unseasoned veneer 3 is continuously pressurized by the drying device 9, so that information which is important to accurately conduct processing of the unseasoned veneer 3 after the unseasoned veneer 3 is transported to the following process, where information about relative position of the unseasoned veneer 3 to the route stand 5*d* as the base of transportation (hereinafter referred to as "veneer positioning information") will not be lost.

Next, when the upper cylinder 9*d* at the center is driven, the unseasoned veneer 3 starts falling and stops when the upper cylinder falls down to its lowest level. This is because it is set in advance that the movement of the central upper cylinder 9*d* permits the press force of the upper hot plate 9*b* to become larger than that of the lower hot plate 9*a*. As a result, the upper surface of the unseasoned veneer 3, as explained below with reference to FIG. 5, is positioned one stage lower than the base line of transportation.

As described above, lowering of the unseasoned veneer 3 from the base line of transportation by one stage prevents the lost of the positioning information due to the contact of the holding surface table 5*j* and the veneer supporting plate 5*c* to the unseasoned veneer 3 when the veneer feeding device 5 returns to it original position to prepare for the insertion of the following unseasoned veneer 3 even if there is a disorder in the unseasoned veneer 3.

Figure 5A:
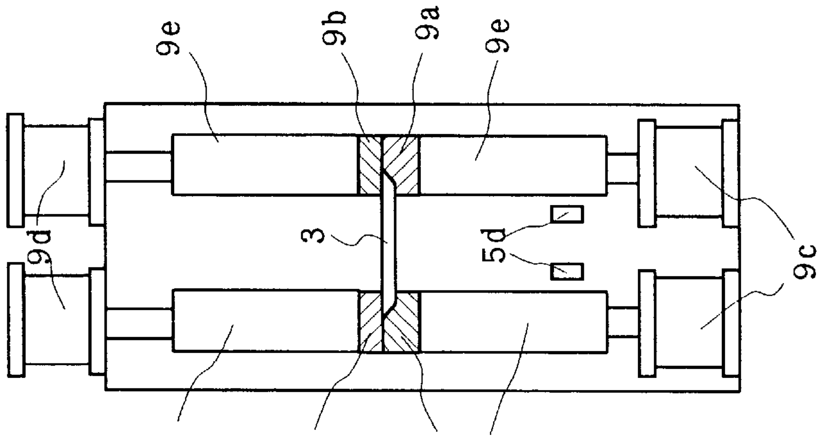
FIGS. 5*a* and 5*b* are a schematic cross-sectional side view and a schematic cross-sectional front view for explaining the drying process of bonding faces by the drying device.
Figure 5B:
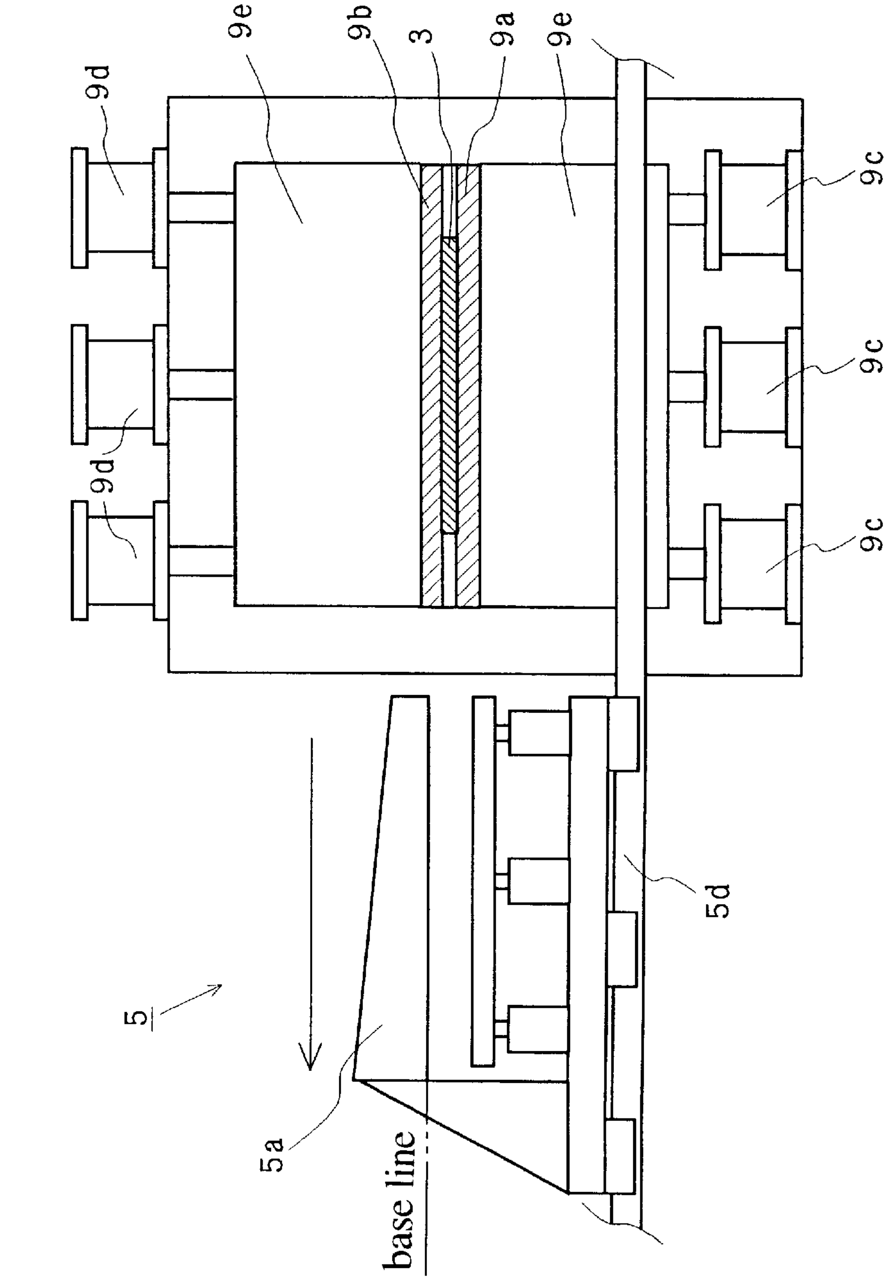

FIG. 5 is a schematic cross-sectional front view and a schematic cross-sectional side view for explaining the drying of the bonding faces through drying device 9. As understood from the schematic cross-sectional side view, contact faces of the unseasoned veneer 3 and each of the hot plates are designed such that the contact faces between the unseasoned veneer 3 and the upper hot plate 9*b* are flat plane where as those between the unseasoned veneer 3 and the lower hot plate 9*a* is an inclined surface corresponding to the scarf-shaped bonding face.

Further, although no drawing is attached, in order to secure the pressurizing and heating of the scarf-shaped bonding surface through each of the hot plates, at the pressurizing of the bonding face, the lower hot plate 9*a* is formed to have an inclined surface which generates a little clearance (about 0.5 mm) between the hot plates.

The lower hot plate 9*a* and the upper hot plate 9*b* are set to be 160° C. to 170° C. through vapor. Further, the cylinder pressure at the pressurizing and heating of the scarf-shaped bonding face is set to be from 7 atoms to 8 atoms. Then, the bonding face is dried under the aforementioned conditions to obtain desired drying condition after about 12 seconds.

Figure 6:
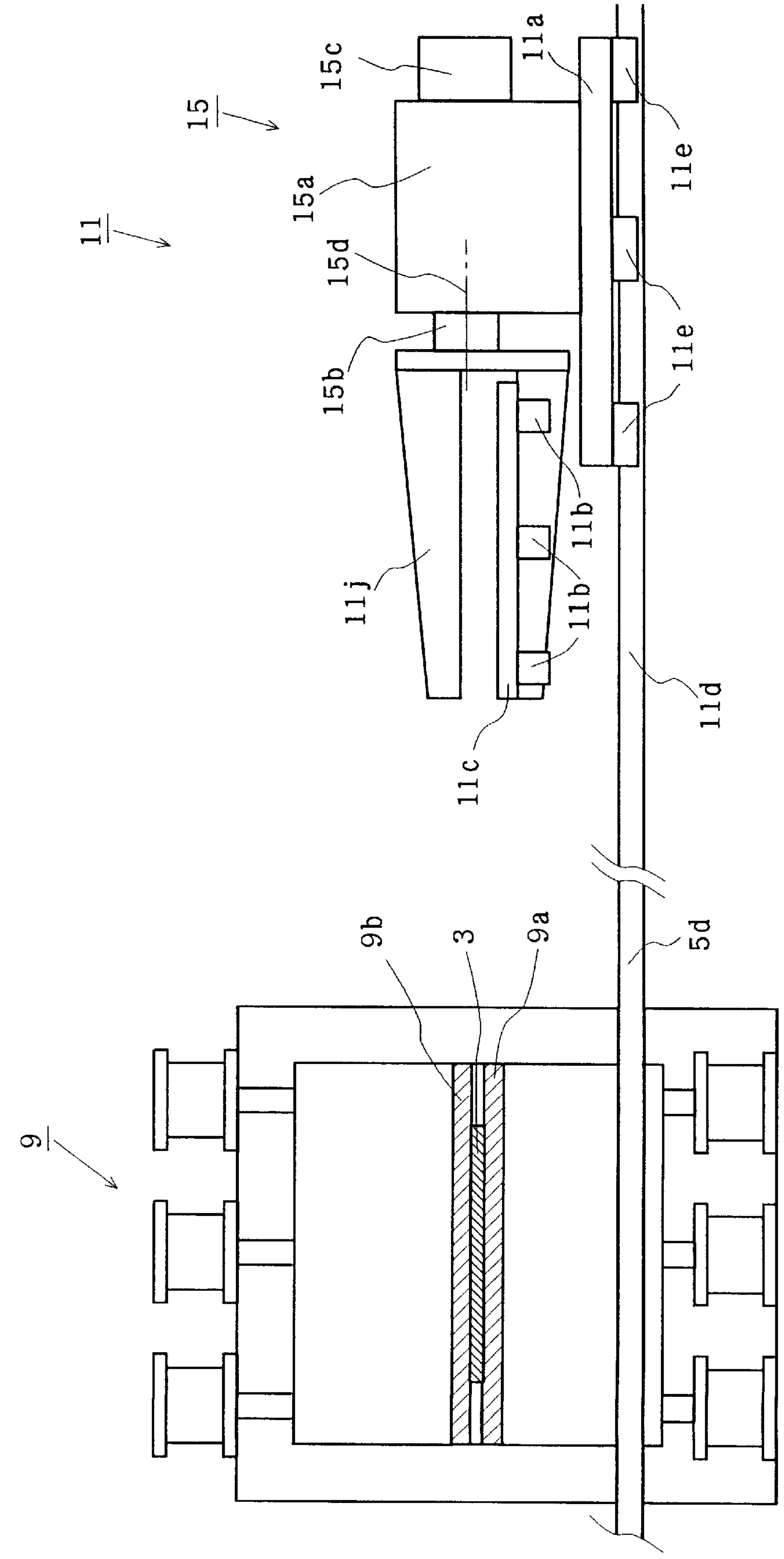
FIG. 6 is a schematic cross-sectional front view of a veneer transporting device for transporting a veneer from the drying device.
Figure 7:
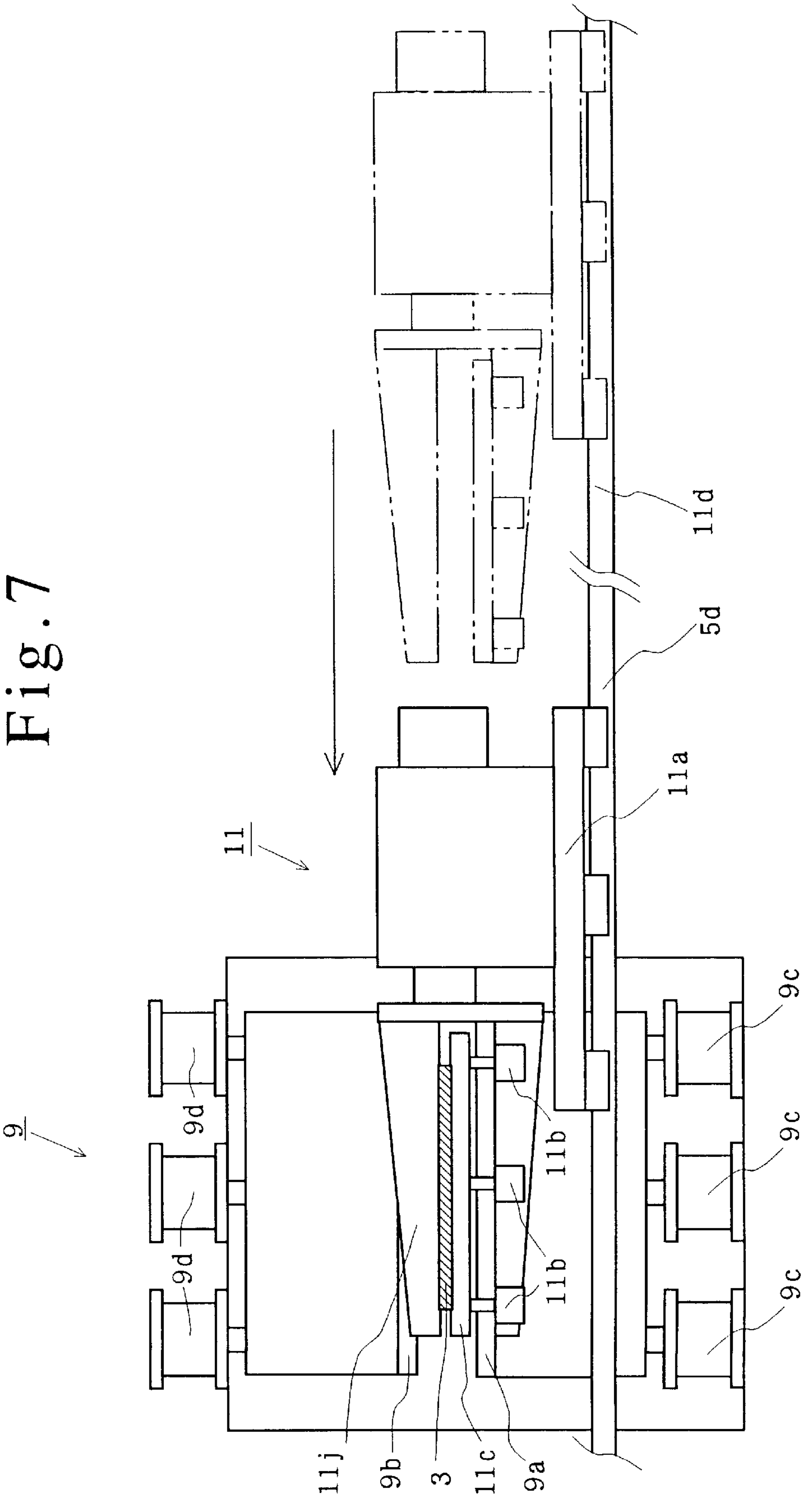
FIG. 7 is a schematic cross-sectional front view for explaining the delivery of a veneer from the drying device to the veneer transporting device.

Next, FIG. 6 is a schematic cross-sectional front view of the veneer transporting device 11 for transporting the unseasoned veneer 3, of which bonding faces are completely dried, from the drying device 9, and FIG. 7 is a schematic cross-sectional front view for transporting the unseasoned veneer 3 from the drying device 9 to the veneer transporting device 11.

Firstly, the veneer transporting device 11 nips the unseasoned veneer 3 while the drying device 9 nips the unseasoned veneer 3, and is provided with the adjusting device 15 to transport the unseasoned veneer 3 to a pressurizing device in the following process after the drying device 9 releases the nipping of the unseasoned veneer 3.

The veneer transporting device 11 is provided on a base 11*a* thereof with a holding surface table 11*j*, and a veneer supporting plate 11*c* which is vertically movable through cylinders 11*b*. Further, like the veneer feeding device 5, the base 11*a* of the feeding device is supported on rails 11*d* through bearings 11*e*, and further, although drawings are omitted, the base 11*a* is movable along the rails 11*d* via a driving belt which is connected to and fixed to the base 11*a* through a pulley receiving driving force from a motor.

Next, in the adjusting device 15, the veneer supporting plate 11*c*, the cylinder 11*b*, the holding surface table 11*j* and the like are connected to a main body 15*a* of the adjusting device 15 through the connecting shaft 15*b*.

Further, the connecting shaft 15*b* receives driving force from the adjusting device 15 provided on the main body 15*a* and is rotatable about the axis 15*d* of rotation of the connecting shaft 15*b* to an arbitrary position. As a result, the rotation of the connecting shaft 15*b* causes the veneer supporting plate 11*c*, cylinder 11*b*, and the holding surface table 11*j* to simultaneously be rotated to arbitrary positions.

In this connection, the level of the axis 15*d* of rotation is set to be a position where it is lowered by a half of the maximum thickness of the veneer from the level of the holding surface table 11*j* as the base line of transportation.

That is, in the embodiments of the present invention, the thickness of the unseasoned veneers which are bonded to each other is set to be 3 mm to 6 mm. Therefore, the level of a center line of rotation 15*d* is set to be at a position lower by 3 mm, that is, by a half of 6 mm of maximum thickness of veneers than the base plane of transportation. The reason why the height of the center line 15*d* of rotation is determined in such a manner as described above will be explained below.

Next, referring to FIG. 7, a method of delivering the unseasoned veneer 3 from the drying device 9 to veneer transporting device 11 will be explained. This delivering method is basically performed in a manner reverse to that explained with reference to FIG. 4.

The unseasoned veneer 3 is pressurized and heated by the lower hot plate 9*a* and the upper hot plate 9*b* at a position one stage lower than the base line of transportation, so that the veneer transporting device 11 (which is indicated by the two-dot chain line in the figure) in which the cylinder 11*b* is lowered to lower the veneer supporting plate 11*c* proceeds without contacting the unseasoned veneer 3.

After the veneer transporting device 11 proceeds to the delivering position and stops at this position, firstly, the press by the central upper cylinder 9*d* of the drying device 9 is ceased to elevate the upper cylinder 9*d*. As a result, the pressure to the lower hot plate 9*a* becomes larger than that to the upper hot plate 9*b*, so that the lower cylinder 9*c* is elevated to the highest position and stops at this position. Therefore, the unseasoned veneer 3 stops at a position where the unseasoned veneer 3 is in contact with the holding surface table 11*j*.

Then, the cylinder 11*b* of the veneer transporting device 11 is operated to elevate the veneer supporting plate 11*c*, allowing the unseasoned veneer 3 to be pressurized to the holding surface table 11*j* and to be situated thereon.

Then, all lower cylinders 9*c* of the drying device 9 are lowered, and all remaining upper cylinders 9*d* are elevated to release the state that the unseasoned veneer 3 is pressurized and heated by the upper and lower hot plates. At that moment, even if the sustainment of the unseasoned veneer 3 and the drying device 9 are canceled, the pressurizing and the sustaining by the veneer transporting device 11 are carried out before the releasing, which permits the delivery of the unseasoned veneer 3 without loosing the veneer positioning information.

Figures 8A, 8B:
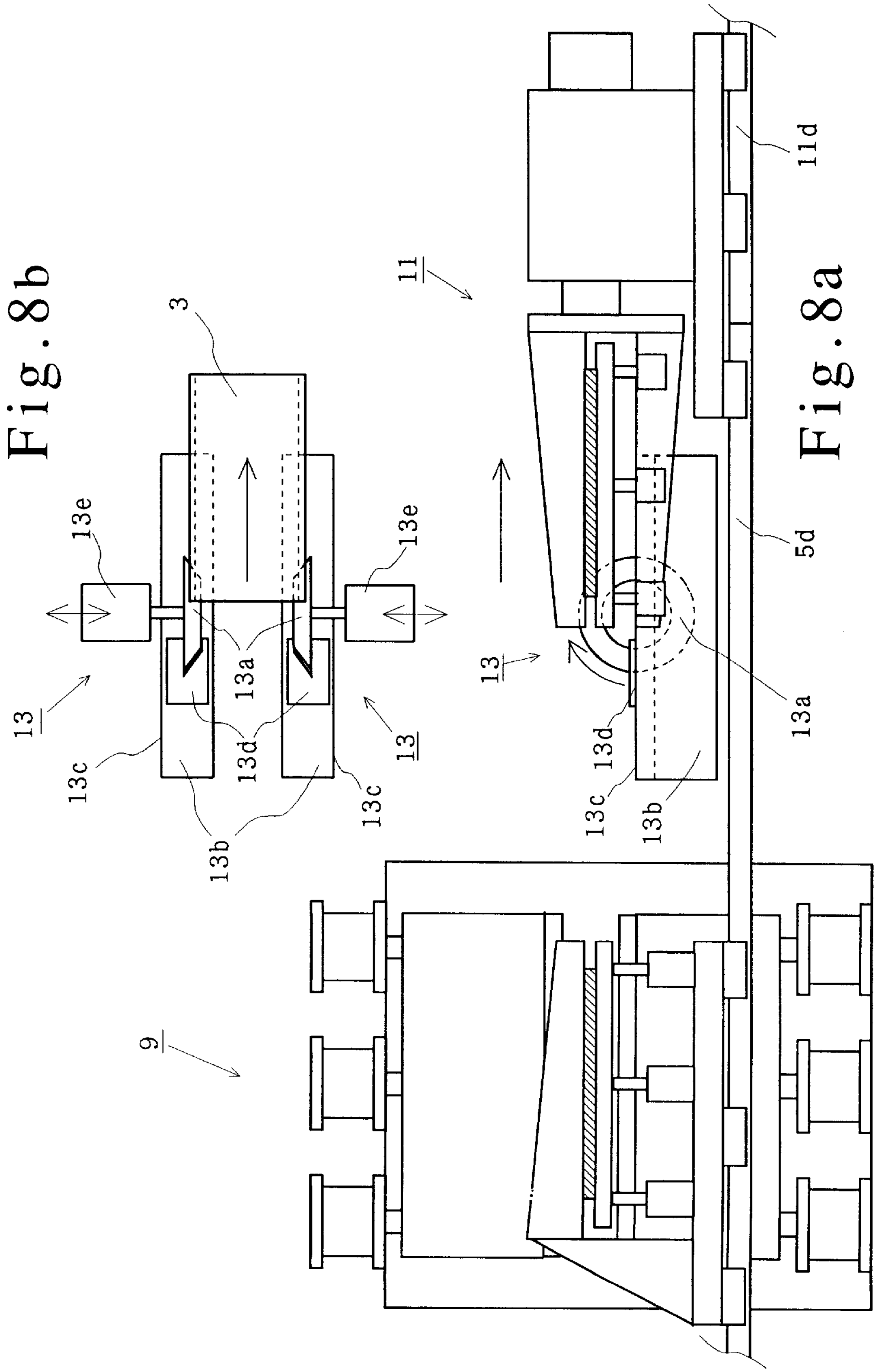
FIGS. 8*a* and 8*b* are a schematic cross-sectional front view and a schematic partial plan view of a bonding agent applying device for applying a bonding agent to the bonding faces of a veneer.

FIG. 8 are a schematic cross-sectional front view and a schematic partial plan view of the bonding agent applying device 13 for applying bonding agent to the scarf-shaped bonding faces of the unseasoned veneer 3.

Firstly, the bonding agent applying device 13 comprises: bonding agent applying rolls 13*a*; thermosetting bonding agent 13*b* (hereinafter referred to as “bonding agent”); vessels 13*c* for storing the bonding agent 13*b*: adjusting plates for adjusting the amount of the bonding agent 13*b*; and motors 13*e* for rotating the bonding agent applying rolls 13.

The bonding agent applying rolls 13*a* are installed to apply the thermosetting harden agent 13*b* to the scarf bonding faces of the unseasoned veneer 3, and the shape of the outer peripheral surface of the bonding agent applying roll 13*a* which contacts the scarf bonding face corresponds to the inclination of the scarf bonding face. The bonding agent applying roll 13 is driven and rotated by the motor 13*e* to apply the bonding agent to the scarf bonding face of the unseasoned veneer 3. Although it is not illustrated in the figures, the outer peripheral surface of the bonding agent applying roll 13*a* is formed therein with a suitable number of channels along a direction in which the bonding agent applying roll 13*a* rotates. As a result, not only adhesion of the thermosetting bonding agent 13*b* to the bonding agent applying roll 13*a* is improved, but also the application of the thermosetting bonding agent 13*b* to the scarf boding face are stably be carried out.

The adjustment of the bonding agent 13*b* to the scarf-shaped bonding face is carried out by moving the adjusting plate 13*d* to make a clearance between the adjusting plate 13*d* and the bonding agent applying roll 13*a*, and by adjusting the clearance. Therefore, the plenty of bonding agent 13*b* adhered to the outer periphery of the bonding agent applying roll 13*a* is scraped off except for the amount of the bonding agent 13*b* which passes through the clearance.

Although it is not illustrated again in the figures, a mounting stand for fixing and holding each of the motors 13*e* thereon is connected to the cylinder so that each of the motors 13*e* is movable along a direction perpendicular to the direction in which the unseasoned veneer 3 is transported, and if occasion demands, the mounting stands are to be controlled so as to separately move between a bonding agent applying position where each of the bonding agent applying rolls 13*a* contacts the scarf bonding face, and a retreated position where the bonding agent applying roll 13*a* does not contact the scarf bonding face. Therefore, when it is desired that the thermosetting bonding agent 13*b* is applied to the scarf-shaped bonding faces at both end portions of the unseasoned veneer 3 or to either one of the scarf-shaped bonding faces, the bonding agent applying rolls 13 are properly controlled to move to the applying positions.

Then, the unseasoned veneer 3 which is delivered from the drying device 9 to the veneer transporting device 11 is extracted from the drying device 9 due to the movement of the veneer transporting device 11. Then, at the moment the unseasoned veneer 3 during transportation passes through the bonding agent applying device 13, the scarf-shaped bonding face contacts the bonding agent applying roll 13*a*, which applies the thermosetting bonding agent 13*b* to the scarf-shaped bonding face.

Next, as for a direction and speed of the rotation of the bonding agent applying roll 13*a*, the direction of the rotation is the same as that in which the unseasoned veneer 3 is transported, and the speed is set to be slower than that in which the unseasoned veneer 3 is transported. That is, in case that the rotational speed is faster than that of the transportation, the thermosetting bonding agent 13*b* is allowed to only collect between the unseasoned veneer 3 and the bonding agent applying roll 13*a* so that it is difficult for the thermosetting bonding agent 13*b* to be applied to the bonding face. Further, in case that the rotational speed is in synchronization with the speed of transportation, the state of application is improved in comparison to the case that the rotational speed is faster. However, the amount of bonding agent 13*b* applied to the scarf-shaped bonding face was unstable.

Figure 9:
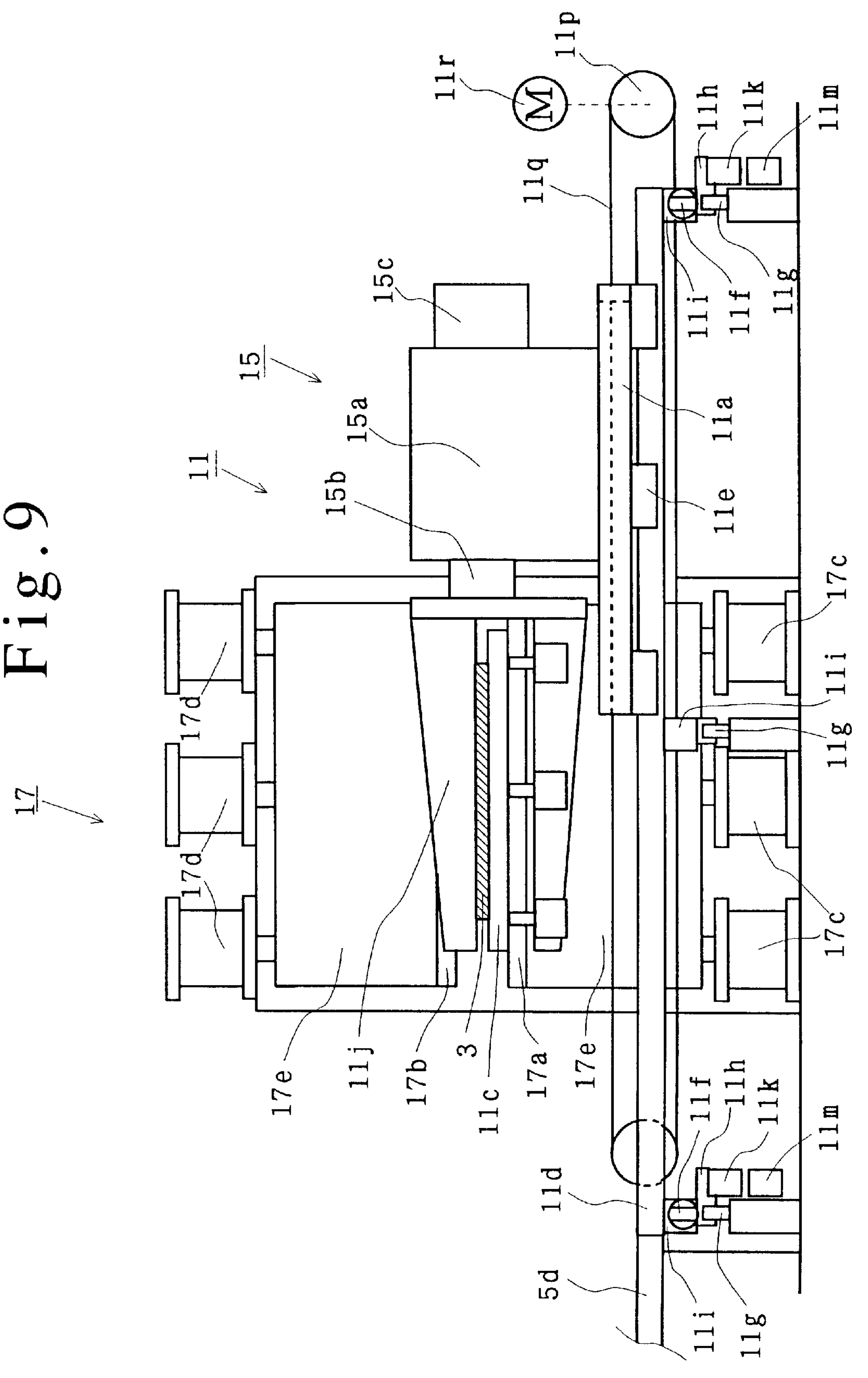
FIG. 9 is a front views of the veneer transporting device and an adjusting device.
Figure 10:
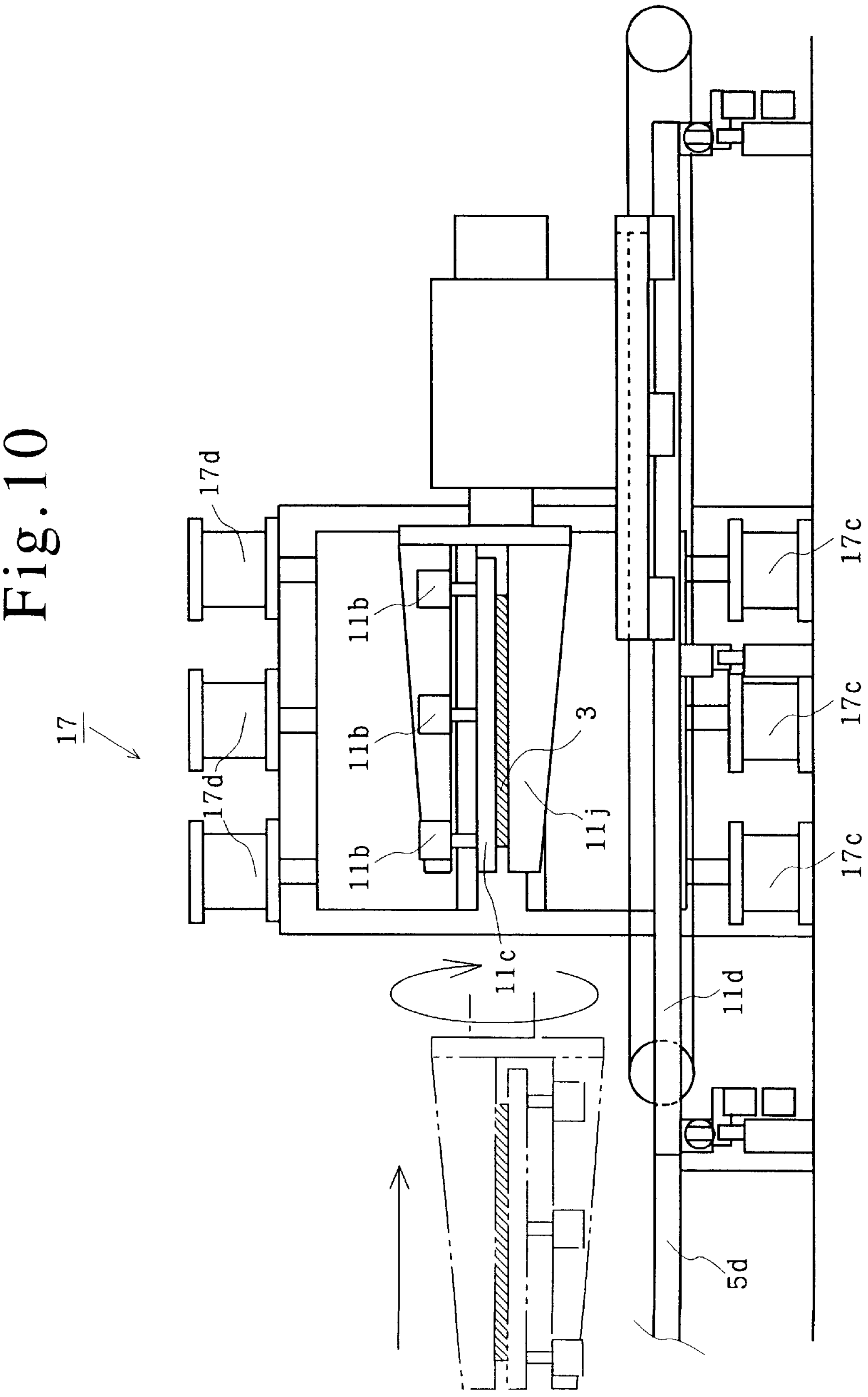
FIG. 10 is a front view for explaining a method of transporting a veneer.

FIGS. 9 and 10 are a front view of the adjusting device 15 for adjusting the front end bonding face of a succeeding veneer to the rear end bonding face of a preceding veneer in such a manner that the face side of the preceding unseasoned veneer 3 and the inner face of the succeeding unseasoned veneer 3 are flush with each other, and a front view of the veneer transporting device 11 for transporting the unseasoned veneers 3 to the pressurizing device 17 for bonding the adjusted bonding faces through heating and pressurizing.

In this connection, FIG. 9 is a drawing for explaining a case that the preceding unseasoned veneer 3 does not stand by in the pressurizing device 17, that is, a method of transporting the first unseasoned veneer 3 to be bonded. Further, FIG. 9 also explains a method of transporting odd-numbered unseasoned veneer 3 from the first unseasoned veneer 3.

FIG. 10 is a drawing for explaining a case that the preceding unseasoned veneer 3 stands by in the pressurizing device 17, that is, a method of transporting the second unseasoned veneer 3 from the first unseasoned veneer 3 to be bonded, and a method of transporting even-numbered unseasoned veneer 3 from the first unseasoned veneer 3.

As clearly understood from FIG. 1, the unseasoned veneer 3 is transported by the veneer transporting device 11 on the route stand 5*d* and the rail 11*d*, and then, the direction in which the unseasoned veneer 3 is transported is converted to a direction perpendicular to the previous transporting direction, that is, a direction that the bonding faces are adjusted, and the unseasoned veneer 3 is transported to the pressurizing device 17.

As a result, the thermosetting bonding agent 13*b* is applied to the unseasoned veneer 3, which is delivered from the drying device 9 to the veneer transporting device 11 while being transported on the route stands 5*d* by the driving pulley 11*p* receiving driving force from the motor 11*r* through a driving belt 11*q*, which is connected to and secured to the base 11*a*, and then, after the veneer transporting device 11 is transferred to the rails 11*d*, the veneer transporting device 11 stops at a predetermined position and is changed in its transporting direction to a direction perpendicular to the direction in which the unseasoned veneer 3 is transported, and the veneer transporting device 11 is transported to the pressurizing device 17 together with the rails 11*d*.

The above-mentioned operation is carried out to adjust the front end bonding face of the succeeding unseasoned veneer 3 to the rear end bonding face of the preceding unseasoned veneer 3.

In FIG. 9, reference symbols 11*f* are cylinders for moving the veneer transporting device 11 in a direction perpendicular to the rails 11*d* to the pressurizing device 17, and the cylinders 11*f* are connected to rail stands 11*i* for supporting the rails 11*d*, and the rail stands 11*i* are mounted on rails 11*g* through bearings 11*h*.

In this connection, reference symbols 11*k* and 11*m* are positioning stoppers for the veneer transporting device 11 in a direction in which the unseasoned veneers 3 are bonded, that is, a direction perpendicular to the rails 11*d*. Normally, the rail stands 11*i* are urged by the cylinders 11*f* such that the bearings 11*h* of the rails 11*g* abut the stoppers 11*k*.

Further, the functions and effects of the stoppers 11*m* are described below.

FIGS. 11 to 22 are schematic cross-sectional side views of the veneer transporting device 11, the adjusting device 15, the pressurizing device 17, the bonded veneers transporting device 19, the regular cutting device, and the like.

Further, the above-mentioned figures are also schematic cross-sectional side views for explaining the motion of bonding the unseasoned veneers 3 after the unseasoned veneers 3 are transported to the pressurizing device 17 one after another in the embodiments of the present invention.

Figure 11:
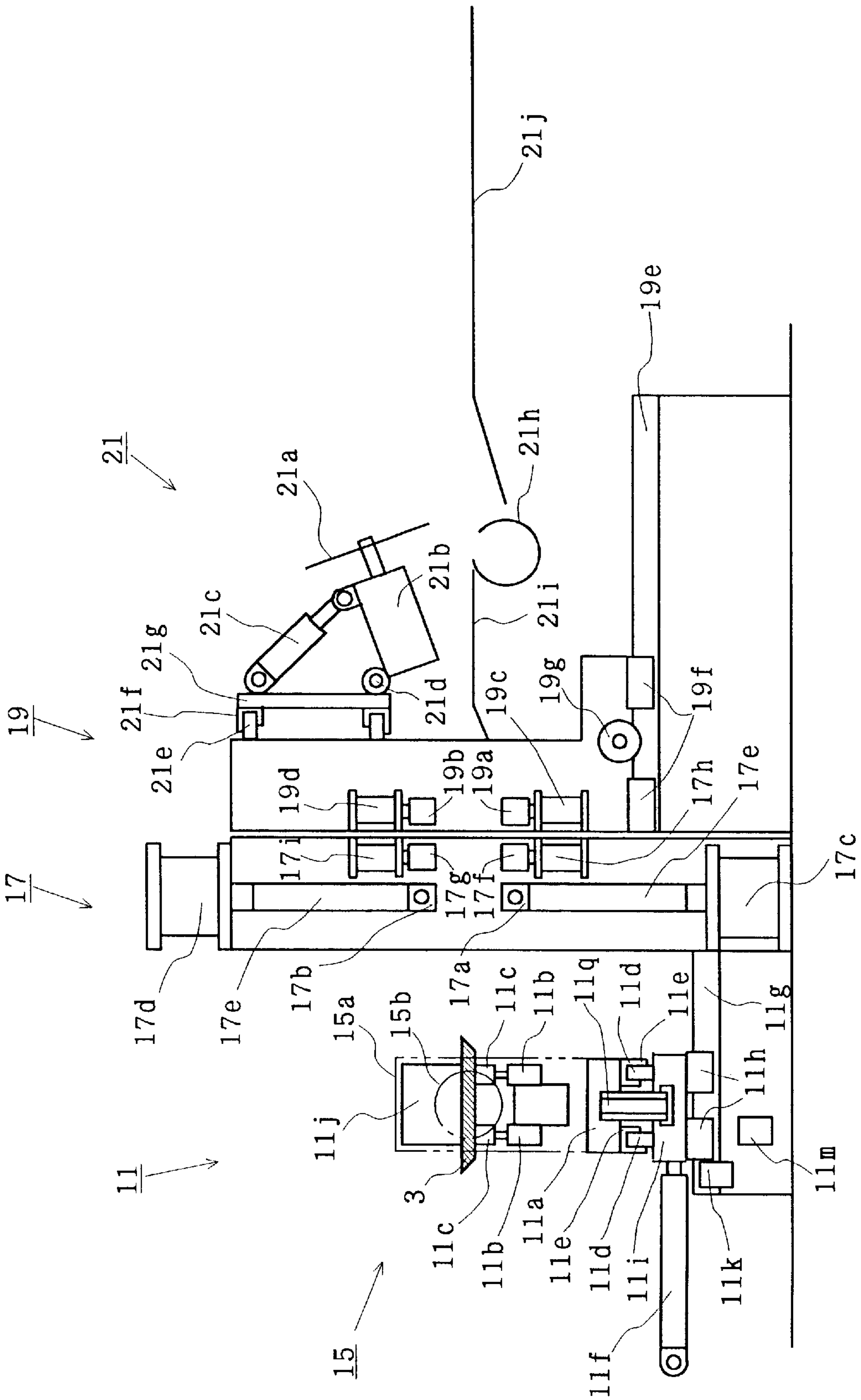

In FIG. 11, reference symbols 17*f*, 17*g* are a lower veneer supporting plate and an upper veneer supporting plate mounted to the pressurizing device 17, are the lower hot plate 17*a* and the upper hot plate 17*b* pressurize and support the unseasoned veneer 3 before the fed unseasoned veneer 3 is being pressurized and heated. As a result, the unseasoned veneers 3 can be bonded with the veneer positioning information before the bonding being securely stored.

Further, when the pressure and heating by the lower hot plate 17*a* and the upper hot plate 17*b* are released, even if each of the hot plates and the unseasoned veneer 3 are adhered to each other due to bonding agent overflowing the bonding faces, the pressure by the upper and lower hot plates 17*a* and 17*b* are released under the condition that portions of the unseasoned veneer 3 adjacent to the boding faces are pressurized and supported by the upper and lower supporting plates 17*f*, 17*g*, there is no shift of the bonded unseasoned veneer at releasing of the adhering, which permits the upper and lower hot plates to be removed from the unseasoned veneer 3 without loosing the veneer positioning information.

Now then, reference symbol 17*h* is a cylinder for vertically moving the lower veneer supporting plate 17*f*, and 17*i* shows a cylinder for vertically moving the upper veneer supporting plate 17*g*. Further, in order to adjust to the base line of transportation of unseasoned veneers, the level of the upper veneer supporting plate 17*g* is set to coincide the level of the base line of transportation under a state that the cylinder 17*h* is extended to its maximum length.

For this reason, the pressure of the lower veneer supporting plate 17*f* is set in advance to be smaller than that of the upper veneer supporting plate 17*g*.

Next, reference symbol 19 is the bonded veneer transporting device for transporting the unseasoned veneer 3 to the bonding position in the pressurizing device 17 (hereinafter referred to as "bonding position") to prepare for the bonding between the rear end bonding face of the unseasoned veneer 3, which is bonded as described above, and the front bonding face of the succeeding veneer. The bonded veneers transporting device 19 is mounted on the rail 19*e* through the bearings 19*f* and is movable along the rail 19*e* through a driving pinion 19*g*, which receives the driving force from a motor (not shown) and rack gear not shown.

Reference symbols 19*a*, 19*b* are a lower bonded veneers supporting plate and an upper bonded plate supporting plate which are mounted to the bonded veneers transporting device 19 to pressurize and support the bonded unseasoned veneer 3. Therefore, the unseasoned veneer 3 is transported to the bonding position under the condition that the veneer positioning information of the bonded unseasoned veneer 3 is securely stored to prepare for the bonding of the rear bonding face to the front end bonding face.

Reference symbol 19*c* is a cylinder for vertically moving the lower bonded veneers supporting plate 19*a*, and 19*d* shows a cylinder for vertically moving the upper bonded veneers supporting plate 19*b*.

In this case also, in order to adjust to the base line of the unseasoned veneer, the level of the upper bonded veneers supporting plate 19*b* is set to be the level of the base line of transportation under the condition that the cylinder 19*d* extended to its maximum length.

As a result, the pressure of the lower bonded veneers supporting plate 19*a* is set in advance to be smaller than that of the upper bonded veneers supporting plate 19*b*.

Next, the regular cutting device 21 for cutting the bonded unseasoned veneer to predetermined length will be explained. The regular cutting device 21 is mounted to the bonded veneers transporting device 19, and is moved on the rail 19*e* in synchronization with the movement of the bonded veneers transporting device 19.

Further, the regular cutting device 21 is mounted to the rail 21*e*, which is disposed in a direction perpendicular to the direction that the bonded unseasoned veneer 3 is transported, through the bearings 21*f*, and is movable along the rail 21*e* through a feeding device (not shown) receiving driving force from a motor (not shown).

Reference symbol 21*a* is a circular saw for cutting the bonded unseasoned veneer to a predetermined length, and is rotated by the motor 21*b*. On the mounting plate 21*g* attached to the bearing 21*f* is mounted the cylinder 21*c* for vertically rotating the circular saw 21*a* about the supporting point 21*d*. Then, only when the unseasoned veneer 3 is cut to a predetermined length, the cylinder 21*c* lowers the circular saw 21*a* to cut it to a predetermined length. Reference numeral 21*h* is dust collecting cover for collecting chips which are generated at the cutting operation through a dust collector (now shown). Reference symbols 21*i* and 21*j* are guide plates for guiding the bonded unseasoned veneers to a piling device (not shown) in the following process.

Then, a method of transporting the unseasoned veneer 3 and a method of bonding the unseasoned veneer 3 with the veneer bonding apparatus 1 will be explained with reference to FIGS. 11 to 22.

Firstly, the unseasoned veneer 3 illustrated in FIG. 11 is the first one of veneers which are to be bonded. Therefore, no unseasoned veneer is transported to the pressurizing device 17 to stand by for the bonding operation.

Figure 12:
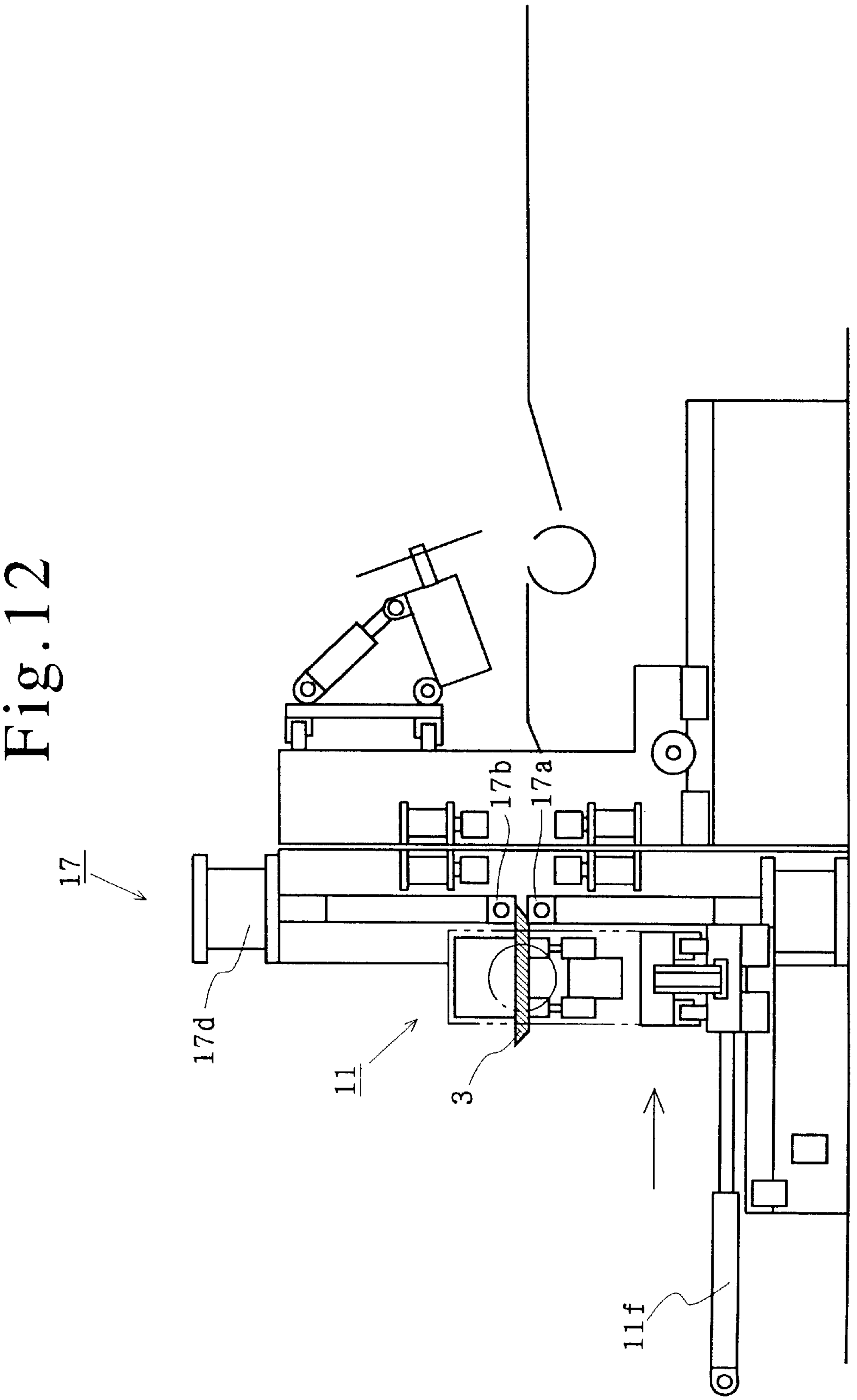

When the first unseasoned veneer 3 is transported to a position shown in FIG. 9 (hereinafter referred to as "standby position for bonding"), as illustrated in FIG. 12, the cylinder 11*f* is operated to transport the unseasoned veneer 3 to the pressurizing device 17, and then, the lower hot plate 17*a* and the upper hot plate 17*b* nip a portion of the unseasoned veneer 3 adjacent to the front end bonding face. At that moment, in order to adjust the base line of transportation of the unseasoned veneer 3, the heights of the upper hot plate 17*b* and the base line of transportation coincide with each other under the condition that the cylinder 17*d* is extremely stretched.

Consequently, the pressure of the cylinder and the like are set such that the pressure of the lower hot plate 17*a* becomes smaller than that of the upper hot plate 17*b*.

Figure 13:
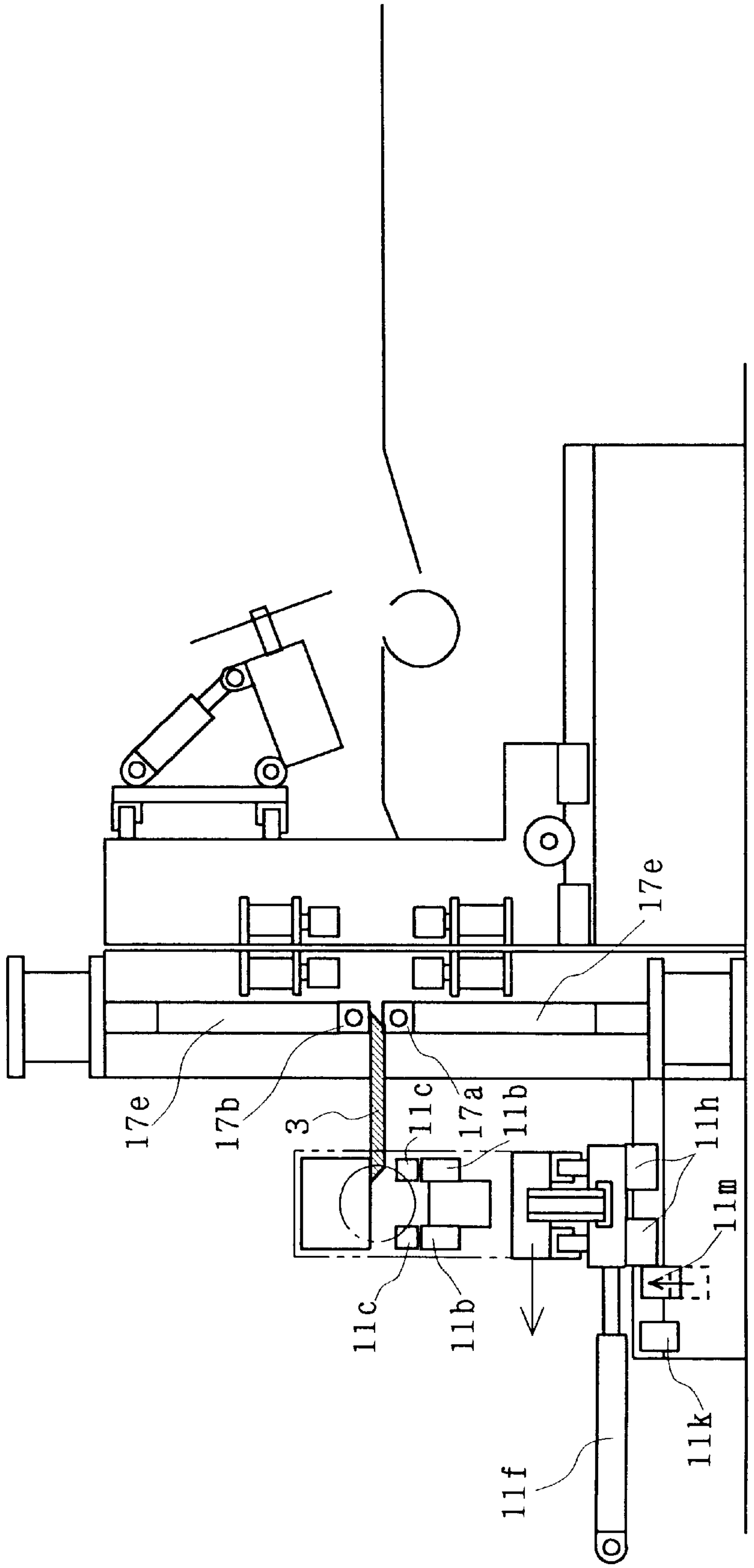
Figure 14:
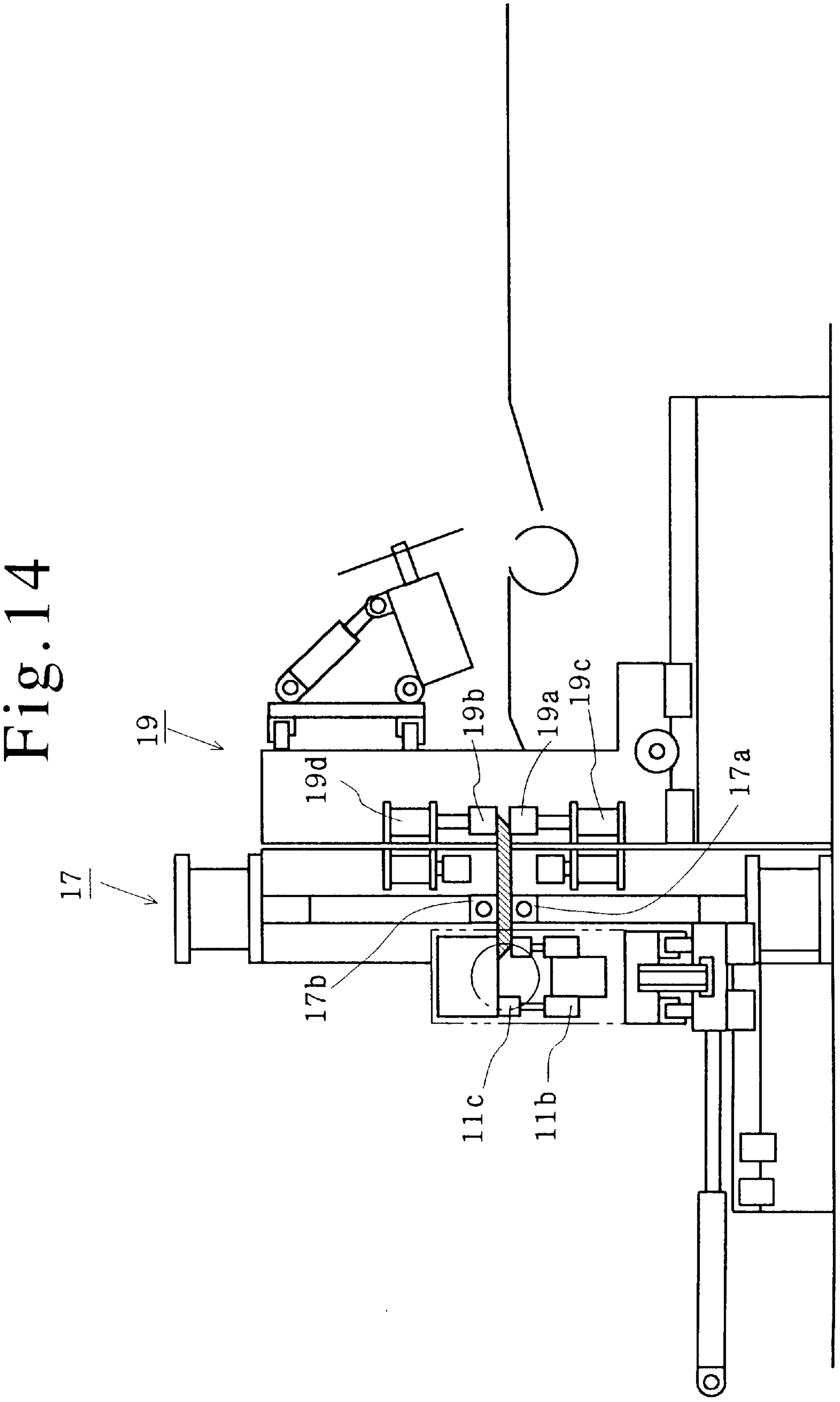

Next, as illustrated in FIG. 13, the cylinder 11*b* of the veneer transporting device 11 is operated under the condition that the lower hot plate 17*a* and the upper hot plate 17*b* nip the unseasoned veneer 3 at the portion adjacent to the front end bonding face thereof to lower the veneer supporting plate 11*c* to release the supporting and fixing of the unseasoned veneer 3.

Then, in order to transport the rear end bonding face to the bonding position between the lower hot plate 17*a* and the upper hot plate 17*b*, firstly, the cylinder 11*f* is operated to cause the veneer transporting device 11 to return to the standby position to transport the rear bonding surface of the unseasoned veneer 3. However, if the veneer transporting device 11 is completely returned to the standby position for bonding, the position can not permit the rear end bonding face of the unseasoned veneer 3 to be nipped, so that the positioning stopper 11*m* is elevated by a cylinder (not shown and to stand by at that position, and the bearing 11*h* abuts the positioning stopper 11*m* and stops there, causing the veneer transporting device 11 to stop at the position where the portion of the unseasoned veneer 3 adjacent to the rear end bonding face is to be nipped.

Then, when the operation of the cylinder 11*b* allows the veneer supporting plate 11*c* to nip the portion of the unseasoned veneer 3 adjacent to the rear bonding face, the operation of the cylinder 11*f* allows the veneer transporting device 11 to start the transportation of the unseasoned veneer 3 toward the pressurizing device 17 again.

Now then, the positioning stopper 11*m* is used only to transport the rear end bonding face of the first unseasoned veneer 3 to the boding position. In other cases, the positioning stopper 11*m* is urged by the cylinder 11*f* so as to cause the positioning stopper 11*k* to abut the bearing 11*h*, and the standby position for bonding is obtained in which the route stand 5*d* and the rail 11*d* are aligned on a straight line.

The unseasoned veneer 3 is transported as described above is, as illustrated in FIG. 14, nipped by the lower hot plate 17*a* and the upper hot plate 17*b* of the pressurizing device 17, and the portion of the unseasoned veneer 3 adjacent to the front end bonding face is nipped by the lower bonded veneers supporting plate 19*a* and the upper bonded veneers supporting plate 19*b* of the bonded veneers transporting device 19.

As a result, the veneer positioning information which has been obtained is to be stored.

After that, it is not illustrated in figures, however, the fixing and supporting of the unseasoned veneer 3 through the veneer transporting device 11 and the pressurizing device 17 are released.

Figure 15:
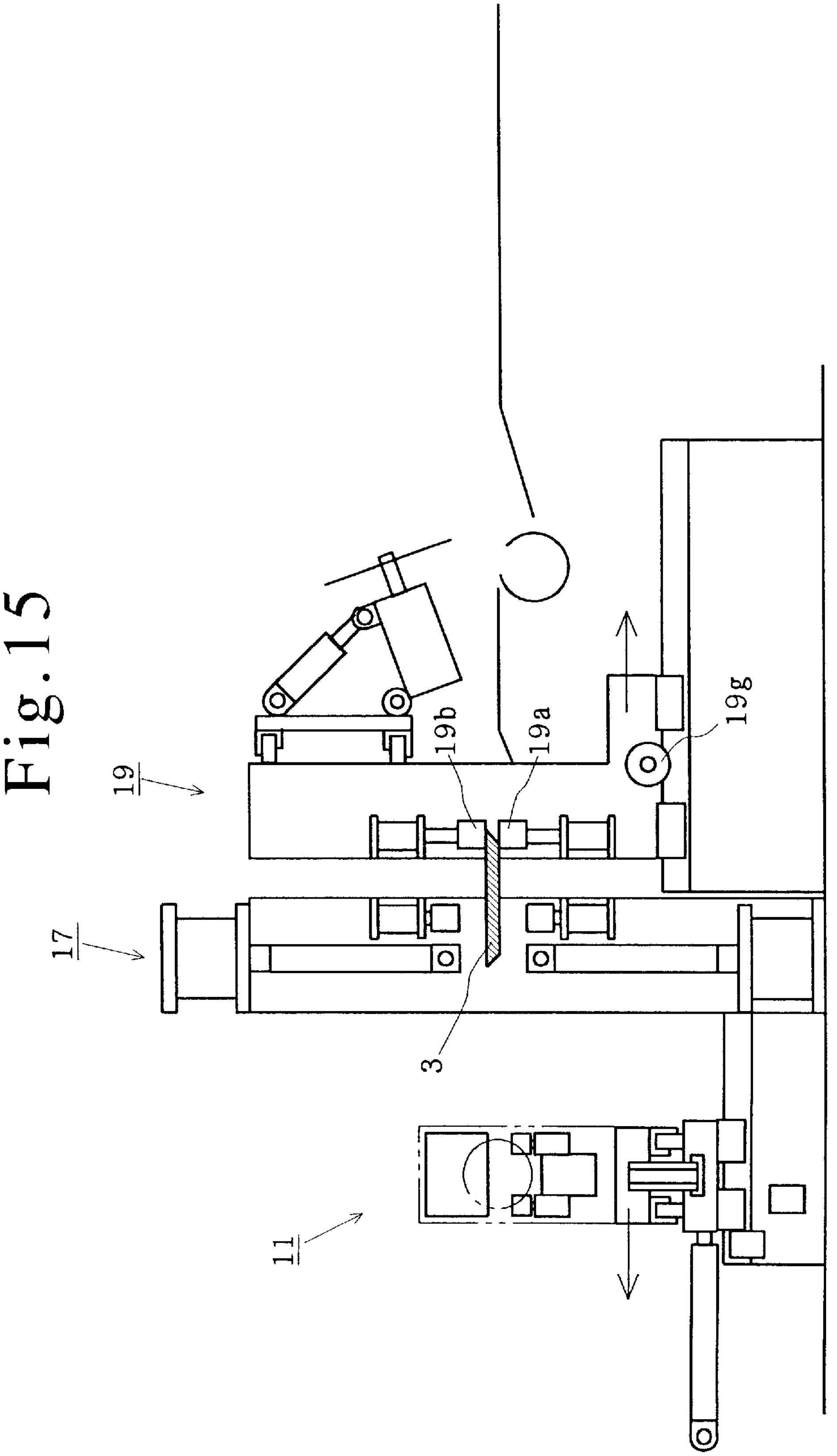

Then, as indicated in FIG. 15, the unseasoned veneer 3 which is fixed and supported at the portion of the front end bonding face thereof is transported in such a manner that the rear end bonding surface thereof is adjusted to the bonding position by the movement of the bonded veneers transporting device 19. Then, the veneer transporting device 11 returns to the standby position for bonding to prepare for the next unseasoned veneer 3 to be bonded.

Figure 16:
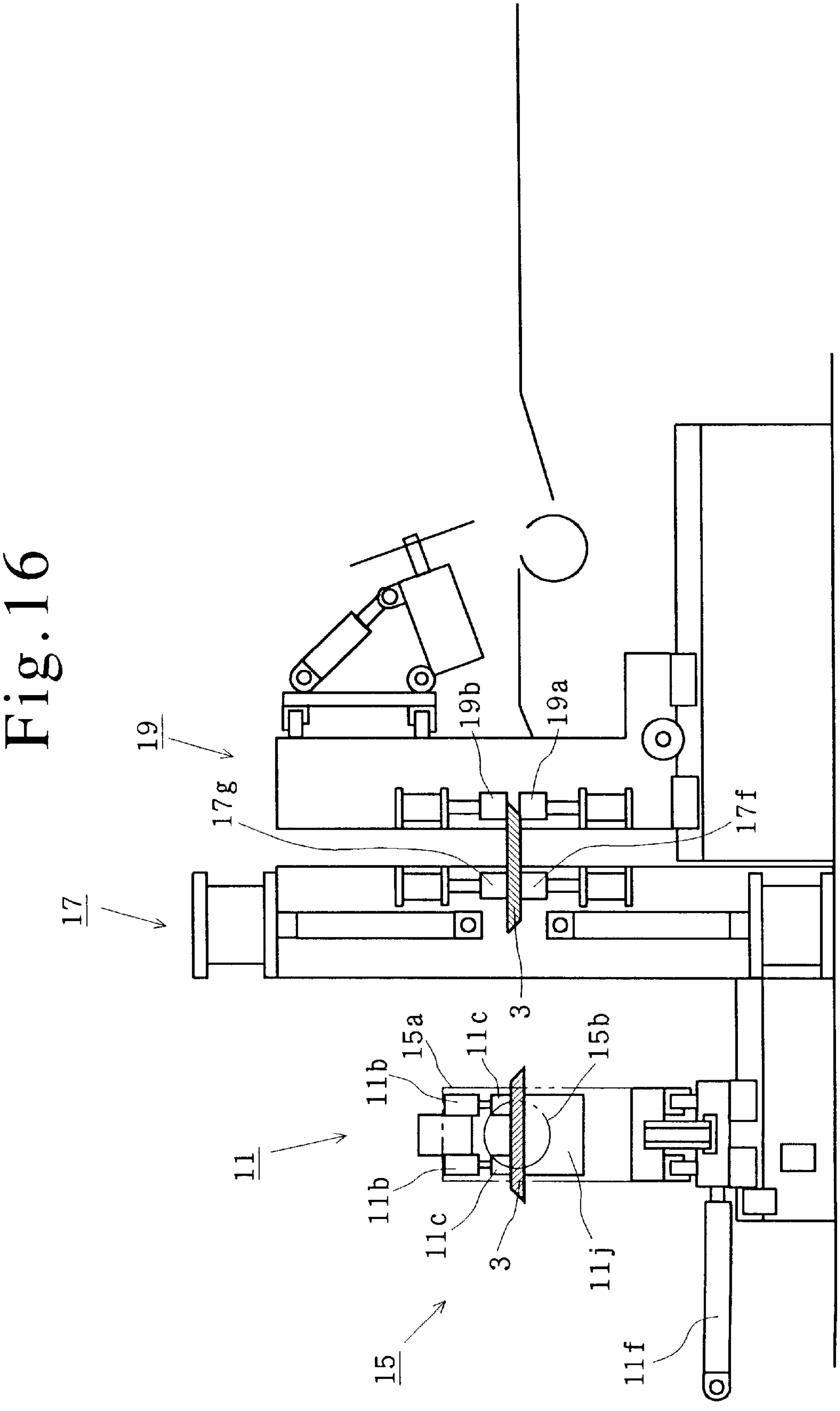

Next, as illustrated in FIG. 16, the unseasoned veneer 3 transported to the bonding position is fixed and supported through the lower veneer supporting plate 17*f* and the upper veneer supporting plate 17*g* of the pressurizing device 17 to prepare for the bonding to the succeeding unseasoned veneer 3.

The succeeding unseasoned veneer 3 transported by the veneer transporting device 11 is reversed by the adjusting device 15 in such a manner that the face side of the preceding unseasoned veneer 3 and the backside of the succeeding unseasoned veneer 3 are flush with each other, and then the unseasoned veneers 3 are transported to the standby position for bonding. As already explained with reference to FIG. 6, in the adjusting device 15, to a main body 15*a* of the adjusting device 15 is connected the veneer supporting plate 11*c*, the cylinder 11*b*, the holding surface table 11*j*, and the like through the connecting shaft 15*b*, and the connecting shaft 15*b* is rotatable about the axis 15*d* of rotation of the connecting shaft 15*b* due to the driving force of the motor 15*c* to an arbitrary position, so that the rotation of the connecting shaft 15*b* causes the unseasoned veneer 3 to be rotatable to an arbitrary position.

Therefore, after the bonding faces are machined, the unseasoned veneer 3 to which at least one bonding face is applied the bonding agent is reversed by the adjusting device 15 before reaching the standby position for bonding .

Now then, the axis 15*d* of rotation is set to be a position 3 mm, that is, a half of the maximum thickness to be bonded, lower than the base line of transportation. Therefore, in the embodiments of the present invention, the thickness of the unseasoned veneer is between 3 mm and 6 mm, therefore, in case that the thickness is 6 mm, when the unseasoned veneer 3 is reversed in such a manner as to allow the face side of the preceding unseasoned veneer 3 and the backside of the succeeding unseasoned veneer 3 to be flush with each other, which causes each of the bonding faces to have the same level.

In the case of an unseasoned veneer with 3 mm of thickness, the level of the veneers becomes lower than the preceding unseasoned veneer 3 by the thickness of the veneer, if the succeeding unseasoned veneer is reversed, since the diameter of the axis 15*d* of rotation is set 3 mm lower. However, if the unseasoned veneers 3 are bonded after adjusted, problems such as deflection of the bonding faces will not arise.

If the distance between the base line of transportation and the axis 15*d* of rotation is set to be shorter than 3 mm, which is a half of the maximum thickness of the veneers to be bonded, for instance 2 mm, when the front end bonding face of the succeeding unseasoned veneer 3 is adjusted to the rear end bonding face of the preceding unseasoned veneer 3 with 6 mm of thickness, although it is not illustrated in figures, the bonding faces abut with each other before the front end bonding face of the succeeding unseasoned veneer 3 reaches the adjusting position, so that if the scarf-shaped bonding face is broken or the bonding faces are bonded under the condition described above, problems such as generation of tiered portion on the bonding face may arise.

Figure 17:
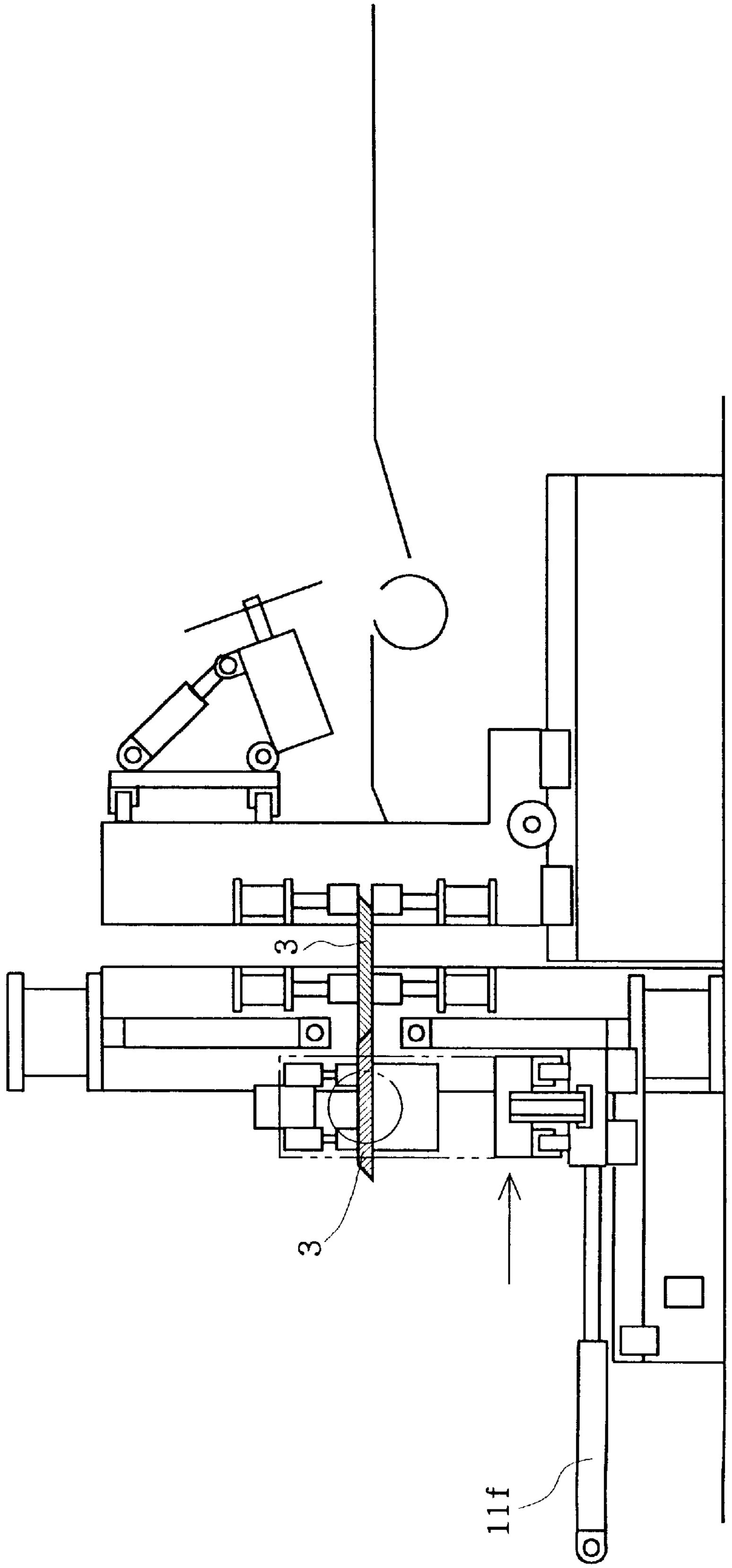

Next, FIG. 17 shows a condition that the front end bonding face of the succeeding unseasoned veneer 3 is adjusted to the rear end bonding face of the preceding unseasoned veneer 3. For example, when all unseasoned veneer 3 which are transported by the veneer feeding device 5 are transported with their face sides turning upward, as a matter of course, the upper surface of the first unseasoned veneer 3 to be bonded is the face side, and the upper surface of the succeeding unseasoned veneer 3 becomes the backside thereof.

The unseasoned veneers 3 are adjusted after reversed, so that the unseasoned veneers 3 are adjusted in such a manner that the face side of the preceding unseasoned veneer 3 and the backside of the succeeding unseasoned veneer 3 are flush with each other.

Figure 18:
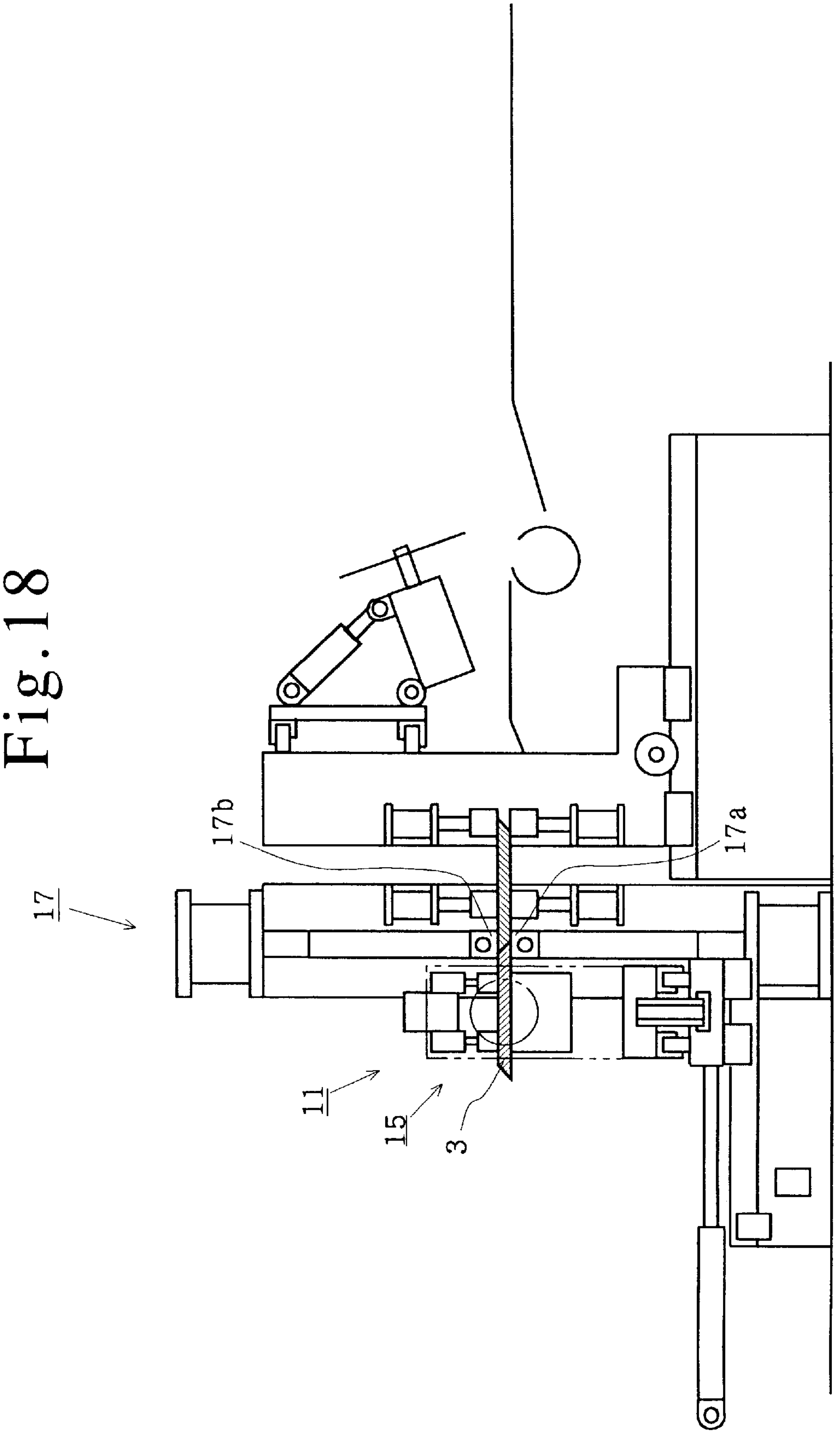

Next, FIG. 18 shows a condition that the bonding faces are pressurized and heated by the lower hot plate 17*a* and the upper hot plate 17*b* after the front end bonding face of the succeeding unseasoned veneer 3 is adjusted to the rear end bonding face of the preceding unseasoned veneer 3. To the lower hot plate 17*a* and the upper hot plate 17*b*, although it is not illustrated in figures, vapor pipes are arranged, and from the pipes, heat source is supplied to each of the hot plates through vapor, and the temperature of the hot plates are set to be between 160° C. and 170° C.

Further, the pressure of the cylinder at the pressuring and heating of the scarf-shaped bonding face is between 7 atoms and 8 atoms, and when handling soft material such as Japanese ceder, the pressure is lowered to be 4 atoms to 5 atoms to prevent low yield rate due to deformation of the material.

Then, under the above-mentioned conditions, the bonding faces are pressurized and heated for approximately 15 seconds.

The bonding agent applied to the bonding faces is hardened due to the thermal conduction from the surface of the veneer adjacent to the bonding faces, so that it is impossible to completely harden the bonding agent at the central portion of the bonding faces for such short period of time, that is, 15 seconds. However, the bonding agent near the surface of the bonding face is sufficiently hardened. Therefore, even if the bonding agent at the central portion of the bonding faces is not completely hardened, it was possible to secure a strength enough to prevent the bonding faces from being removed when handling the unseasoned veneers bonded in the above-mentioned manner in the following process.

When pressurizing and heating of the bonding faces start, the veneer transporting device 11 releases the fixing and supporting of an unseasoned veneer. Then, the veneer transporting device 11 rotates the reversed adjusting device 15 again to return it to an original position, and the veneer transporting device 11 moves toward the drying device 9 to transport the succeeding unseasoned veneer which is to be bonded next.

Figure 19:
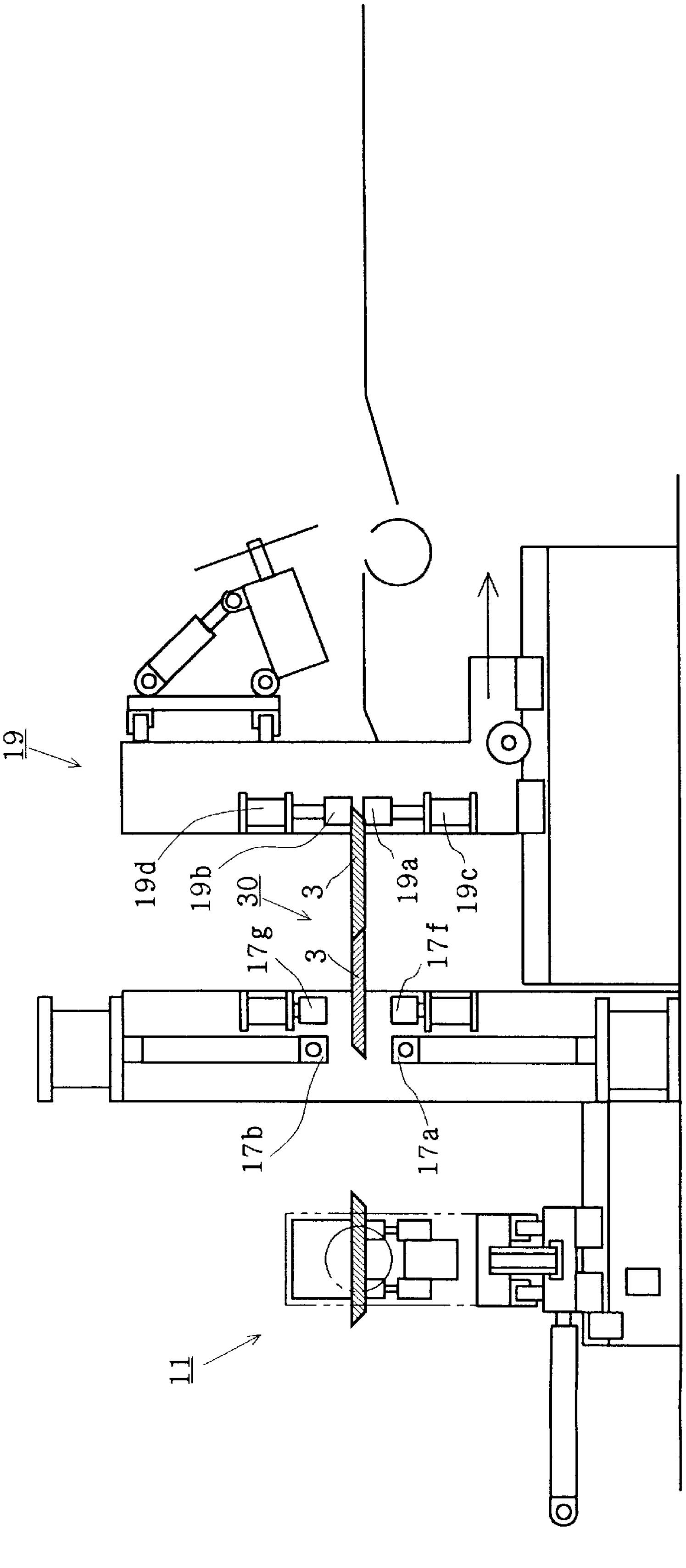

Next, FIG. 19 shows a condition that the bonded unseasoned veneers 3 through heating and pressurizing (hereinafter referred to as "a train 30 of bonded veneers") are transported to the bonding position to prepare for the adjustment of the rear end bonding face thereof to the front end bonding face of the succeeding veneer.

When the pressuring and heating of the bonding face are completed, the lower hot plate 17*a* and the upper hot plate 17*b* first cancel the state of pressuring and heating. Then, the fixing and supporting by the lower veneer supporting plate 17*f* and upper veneer supporting plate 17*g* are canceled.

The above operation is carried out because, separation of the bonding becomes easy while the veneer positioning information is prevented from being lost, even if the bonding agent which overflows the bonding faces causes the hot plates and the unseasoned veneer to adhere to each other as described above.

Then, the bonded veneers transporting device 19 transports the rear end bonding faces of the train 30 of bonded veneers to the bonding position to prepare for the adjustment to the front end bonding faces of the succeeding unseasoned veneers 3.

The train 30 of bonded veneers are supported by the lower bonded veneers supporting plate 19*a* and upper bonded veneers supporting plate 19*b*, so that the veneer positioning information under transportation is continuously maintained.

On the other hand, the veneer transporting device 11 transports the succeeding unseasoned veneer 3 from the drying device 9 and stands by at the standby position for bonding.

The unseasoned veneer 3 is the third veneer from a veneer which is to be bonded first. Therefore, the unseasoned veneer 3 is not rotated by the adjusting device 15.

Figure 20:
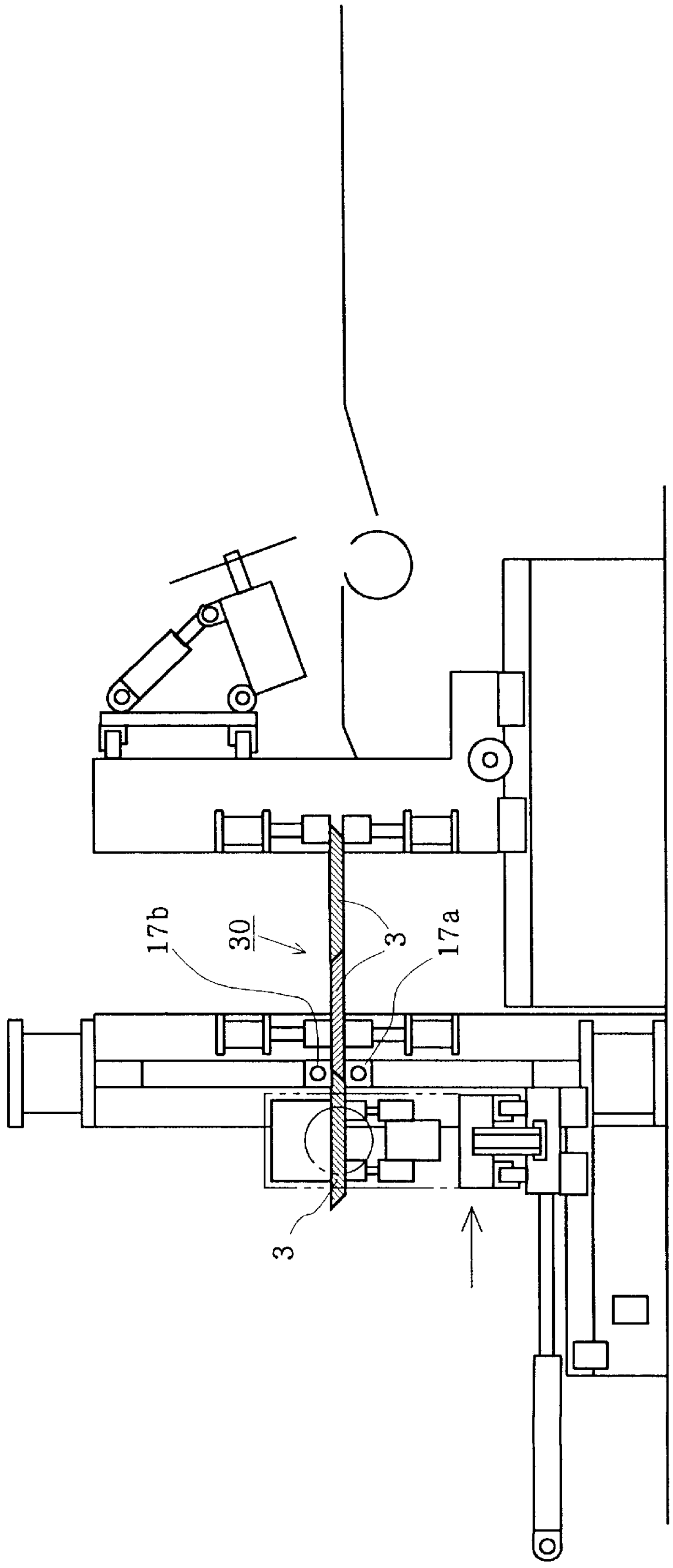

Then, FIG. 20 shows a condition that after the front end bonding face of the succeeding third unseasoned veneer 3 and the rear end bonding face of the preceding train 30 of bonded veneers, the bonding faces are pressed and heated by the lower hot plate 17*a* and the upper hot plate 17*b*.

Figure 21:
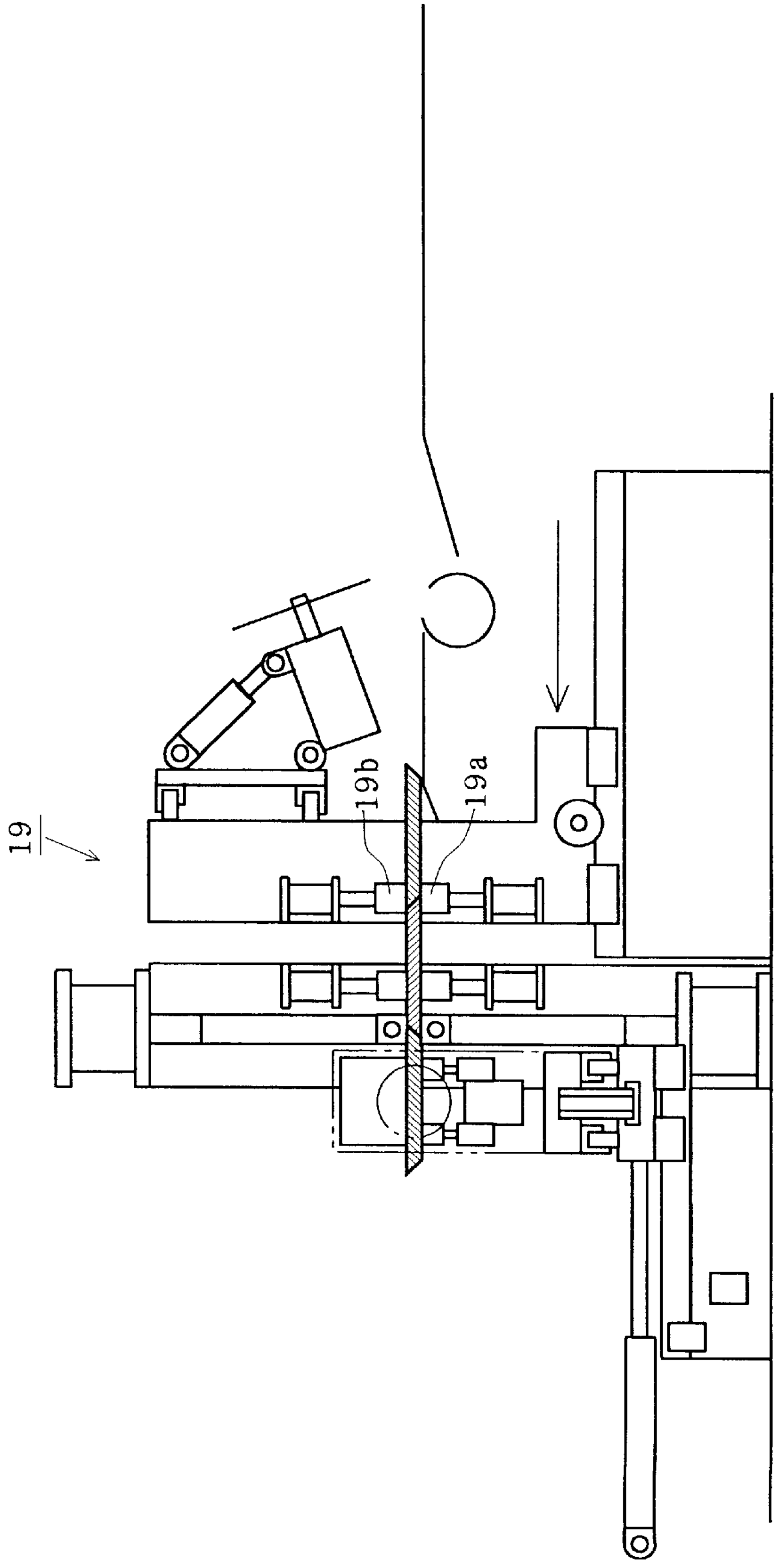

Next, FIG. 21 shows a condition that in order to transport the rear end bonding faces of the train 30 of bonded veneers to prepare for the bonding to the front end bonding face of the fourth unseasoned veneer 3 from the unseasoned veneer 3 which is to be bonded first, that is, even numbered unseasoned veneer (hereinafter referred to as "even numbered unseasoned veneer), the fixing and supporting by the lower bonded veneers supporting plate 19*a* and the upper bonded veneers supporting plate 19*b* are temporarily canceled, and then the bonded veneers transporting device 19 is moved toward the pressurizing device 17 by the width of the unseasoned veneer 3, and the unseasoned veneer 3 is fixed and supported by the lower bonded veneers supporting plate 19*a* and the upper bonded veneers supporting plate 19*b* again.

Although it is not illustrated in figures, the succeeding even-numbered unseasoned veneers are reversed by the adjusting device 15 as described above, and standby thereon.

Figure 22:
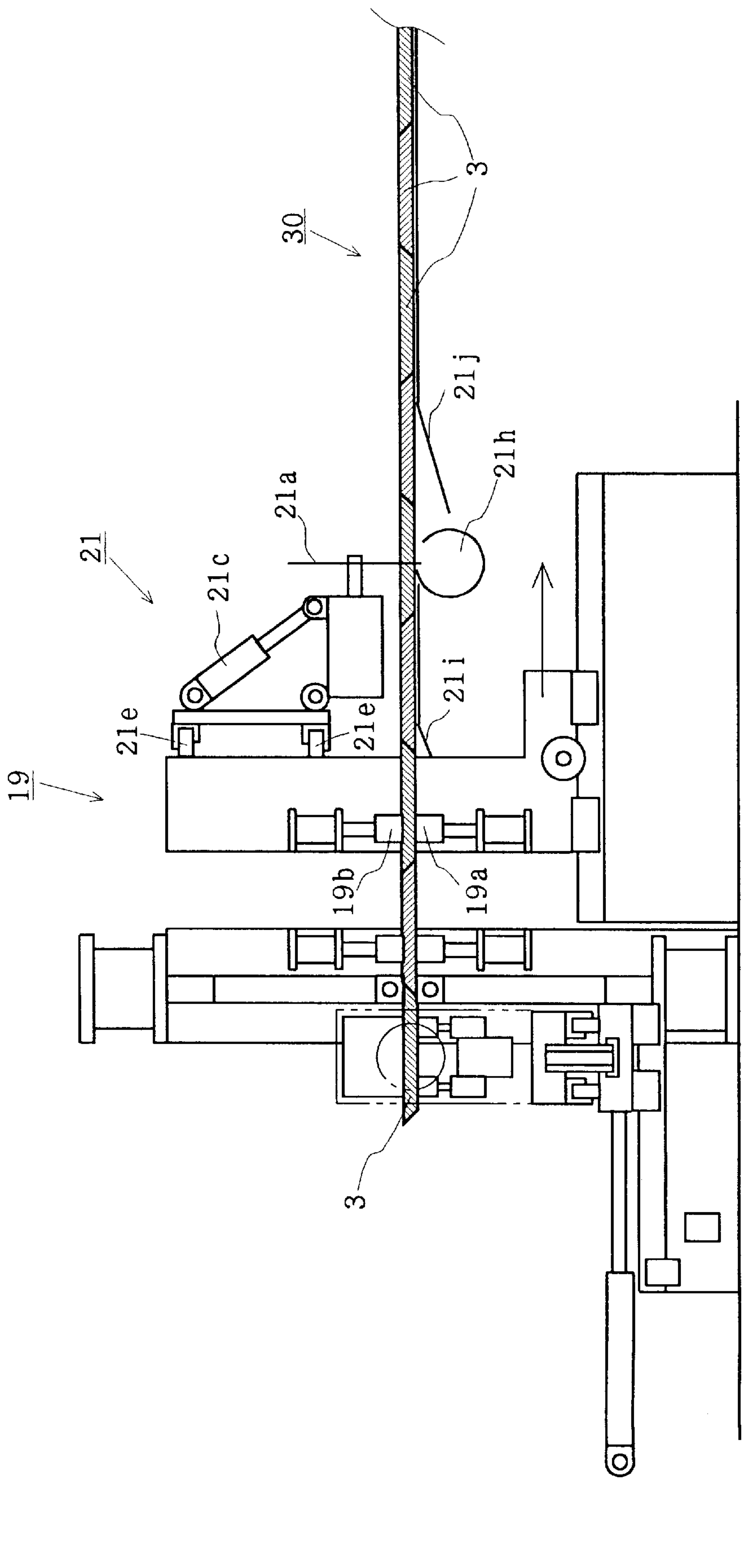

Then, FIG. 22 shows a condition that the train 30 of bonded veneers are cut to predetermined length by the regular cutting device 21 since the train 30 of bonded veneers acquires the predetermined length.

When the train 30 of bonded veneers in which the face sides of the unseasoned veneers and the backsides of the unseasoned veneers are alternately adjusted and bonded acquire the predetermined length, the movement of the bonded veneers transporting device 19 is ceased to stop the transportation of the train 30 of bonded veneers.

Then, after the pressurizing and supporting of the train 30 of unseasoned veneers by the lower and upper bonded veneers supporting plate 19*a*, 19*b* are canceled, the bonded veneers transporting device 19 is moved to transport the circular saw 21*a* to a position corresponding to the predetermined length for cutting.

Then, after the train 30 of bonded veneers are pressurized and supported again by the lower bonded veneers supporting plate 19*a* and the upper bonded veneers supporting plate 19*b*, the cylinder 21*c* is operated to lower the train 30 of bonded veneers to the position where it can be cut by the circular saw 21*a*, and although it is not illustrated in figures, the unseasoned veneer 3 is cut to a predetermined length while the rail 21*e* is moved by a transporting device receiving driving force from a motor in a direction perpendicular to the direction in which the unseasoned veneer 3 is transported.

When the cutting is finished, the cylinder 21*c* is operated to elevate the circular saw 21*a* to move the circular saw 21*a* to a predetermined position to complete the regular cutting operation.

In the embodiments of the present invention described above, the explanation was made for mainly an apparatus for and a method of bonding unseasoned veneers to each other. Next, another apparatus for and a method of bonding dried veneers to each other will be explained with reference to drawings.

Figure 23:
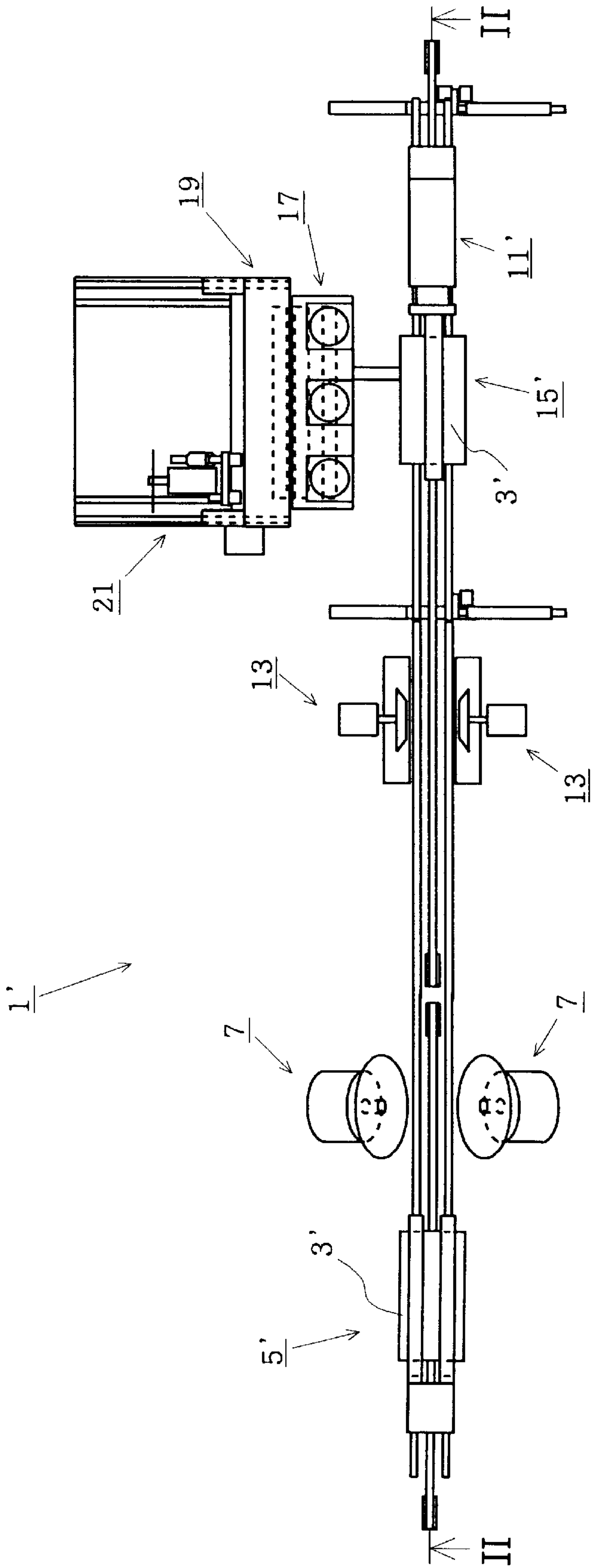
FIG. 23 is a schematic plan view of another veneer bonding device.
Figure 24:
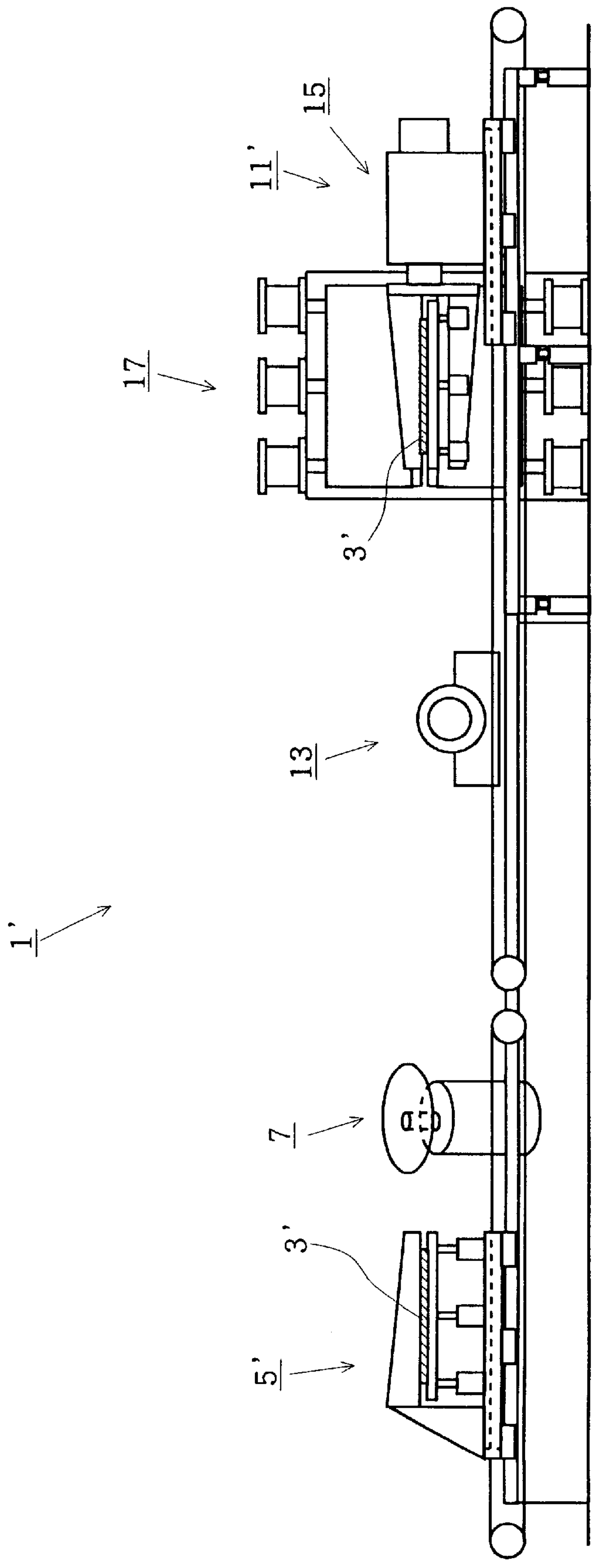
FIG. 24 is a schematic cross-sectional front view of the veneer bonding device taken along the line B—B in FIG. 23.

FIG. 23 is a schematic plan view for the above explanation, and the cross section taken along the line B—B is shown in FIG. 24 as a schematic cross-sectional plan view.

Reference symbol 1' is a veneer bonding apparatus for bonding veneers 3' to each other. In this embodiment, the veneer 3' is not limited to a dried veneer.

The veneer bonding apparatus 1' is explained by indicating difference between the veneer bonding apparatus 1' and the veneer bonding apparatus 1 which is explained with reference to FIGS. 1 to 22.

Firstly, the veneer bonding apparatus 1' is not provided with a device corresponding to the drying device 9 shown in FIG. 1 and 2. This is because the veneer 3' to be bonded is already dried, so that it is unnecessary to dry machined bonding faces thereof by the bonding face machining device 7 as a matter of course.

As a result, after both end portions of the veneer 3' to be bonded are machined by the bonding face machining device 7, bonding agent is applied to at least one bonding face of the machined bonding faces by the bonding agent applying device 13, and then, the front end bonding face of a succeeding veneer is adjusted to the rear end bonding face of a preceding veneer by the adjusting device 15 in such a manner that the face side of the preceding veneer 3' with bonding agent and the backside of the succeeding veneer 3' with bonding agent are flush with each other, and then, the veneers 3' are bonded to each other through cooling press, cold press, and hot press.

The bonding agent used in this process are urea resin, melamin-urea resin, phenolic plastic, resorcinor resin as thermosetting bonding agent, and hot-melt bonding agent as thermoplastic bonding agent.

In case that the veneer 3' is an unseasoned veneer, naturally, machined bonding faces are normally dried by the drying device 9. However, even if the bonding faces are not dried, it is possible to bond the unseasoned veneers to each other by selecting polyurethane bonding agent or water-vinyl-urethane bonding agent as a humidity-setting type bonding agent, which hardens due to the reaction with water in the unseasoned veneer, as a bonding agent used in the bonding agent applying device 13 in the following process.

With those bonding agent, the unseasoned veneers may be bonded through cold press or heat press.

Further, as a method of bonding utilizing water contained in the unseasoned veneer, powder bonding agent such as polyvinyl alcohol is adhered to the bonding faces of the unseasoned veneer, and the bonding faces are heated and pressed so as to be bonded.

In the veneer bonding apparatus 1 described above, the veneer transporting device 11 separately nips the unseasoned veneer 3 while the drying device 9 nips the unseasoned veneer 3. In this embodiment however, there is no such device corresponding to the drying device 9 as described above. Therefore while the veneer feeding device 5' nips the veneer 3', the veneer transporting device 11' with the adjusting device 15 separately nips the veneer 3'.

Consequently, in order to secure a space for simultaneously nipping the veneer 3' through those devices, the shape and construction of the veneer supporting plate 5*c* and the holding surface table 5*j* shown in FIG. 3 and the veneer supporting plate 11*c* and the holding surface table 11*j* shown in FIG. 6 are changed.

The difference between the veneer bonding apparatus 1' and the veneer bonding apparatus 1 are explained above, and other devices and constructions of those apparatus are the same.

Next, embodiments of the present invention relating to shapes of bonding faces at both end portions of a veneer to be bonded, and a method of bonding veneers with the machined bonding faces with the above-mentioned shape will be explained with reference to FIGS. 25 to 28. FIGS. 25*a* to 25*e* are perspective views of veneers of which both ends portions are machined to bonding faces, and FIGS. 26*a* to 26*e* are side views showing conditions that the veneers are bonded.

In this connection, a method of using a circular saw as means for machining to bonding faces was explained above. However, it is possible to use a chamfer cutter, router, a set of circular saws suitable for the shape of the bonding face may be used to machine the faces.

In the veneer disclosed in FIGS. 25*a*, 25*b*, 26*a*, and 26*b*, both end portions thereof are machined in such a manner that the shapes of the end faces are symmetrical about a straight line in a direction of the thickness of the veneer which passes through centers of parallel sides of end face (hatched in the figures) which is in parallel to a direction that the veneer is bonded, that is about an axis a of symmetry.

Especially, in case of scarf-shaped bonding face as indicated in the figures, the veneer may be machined regardless of the thickness of the veneer, and in case that disorder is generated in the veneers to be bonded, the disorder have little effect in adjusting process, resulting in accurately machined bonding faces.

Figures 26A, 26B, 26C, 26D, 26E:
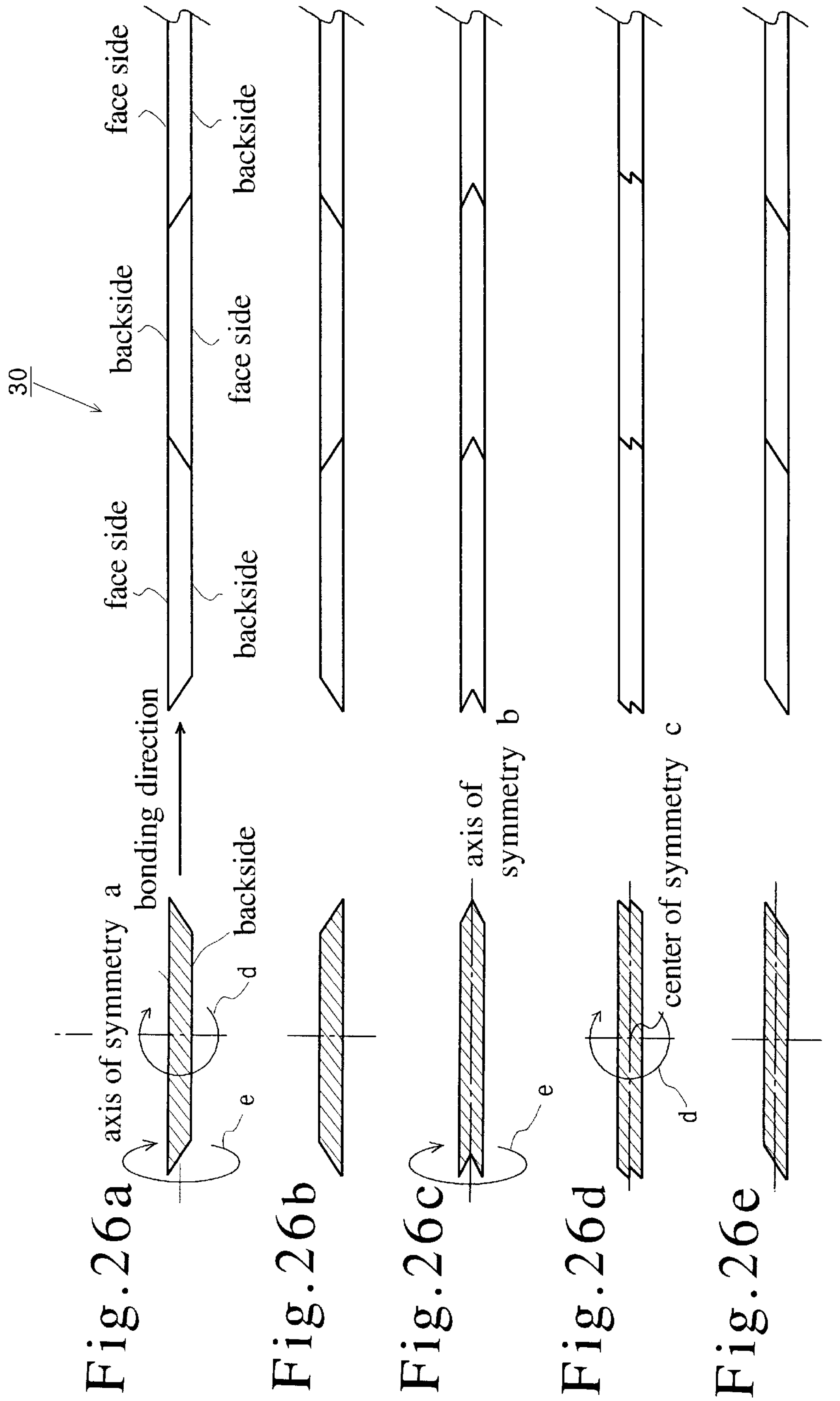
FIGS. 26*a* to 26*e* are side views showing a condition that each of the veneer in FIGS. 25*a* to 25*e* a bonded to each other.

In order to adjust the bonding faces of the veneer such that the face side of a veneer to be bonded and the backside of the other veneer to be bonded are flush with each other, with the means described above, for instance, every other veneers are reversed in a direction d indicated by an arrow mark in FIG. 26*a*. Alternatively, every other veneers are reversed in a direction perpendicular to the veneer bonding direction, for example, in a direction e indicated by an arrow mark in FIG. 26*a* for the adjustment. The explanation and drawings for this embodiment will be omitted.

Consequently, the veneers can be adjusted by the two methods.

Figure 25A:
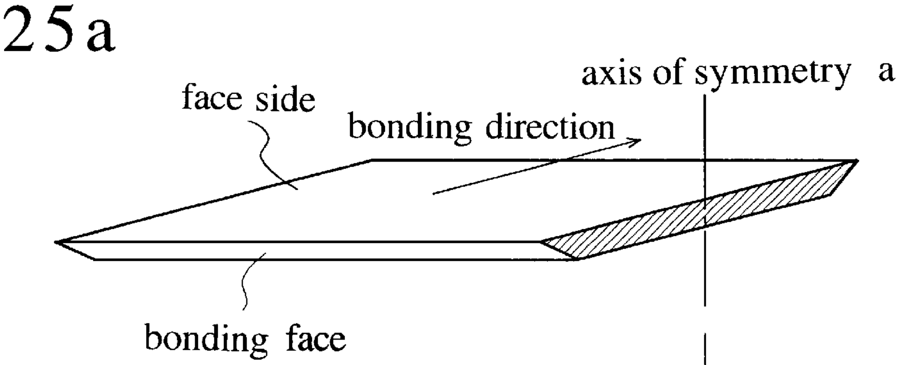
FIGS. 25*a* to 25*e* are perspective views of a veneer of which both end portions are machined to bonding faces with a variety kind of shapes.
Figure 25B:
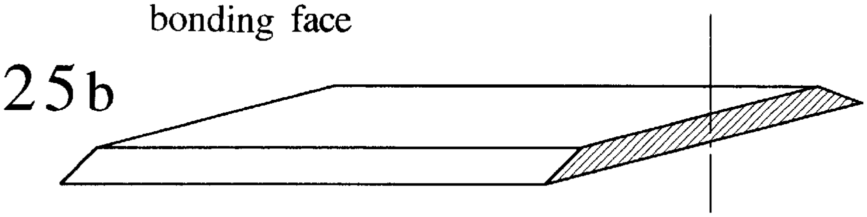
Figure 25C:
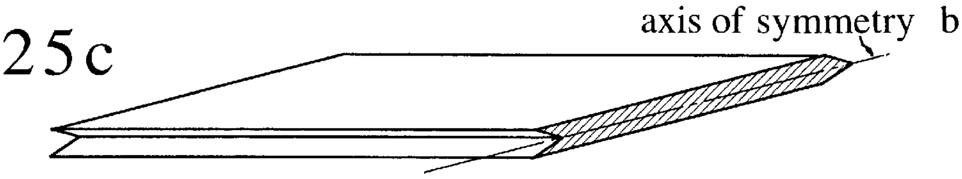

Next, in the veneer illustrated in FIGS. 25*c* and 26*c*, both end portions thereof are machined in such a manner that the shapes of the end faces are symmetrical about a straight line perpendicular to a direction of the thickness of the veneer which passes through a center of a line connecting the through centers of parallel sides of end face which is in parallel to a direction that the veneer is bonded, that is, as shown such that the shape of both end faces are symmetrical about an axis b of symmetry.

The bonding faces with the above-mentioned shapes are effective since machining the faces may be carried out with ease when relatively thick veneers are used.

Further, for instance, as illustrated in FIG. 26*c*, when bonding faces are inserted into and engaged with each other, the bonding faces are not easily disengaged from each other, resulting in stable and strong bonding faces.

In order to adjust the bonding faces of the veneers, it is impossible to use an adjusting method in the above-mentioned two methods in which every other veneers are reversed in a rotating direction d shown by an arrow mark. That is, when the rear end bonding face of a preceding veneer is, for instance, is formed to have a concave portion as illustrated in the figures, the front end bonding face of a succeeding veneer after reversed should have convex portion to bond the veneers to each other for proper bonding.

Consequently, in the adjusting process, as for those bonding faces only, every other veneers are reversed in a direction perpendicular to the bonding direction of the veneer, for instance a direction e indicated by an arrow mark in FIG. 26*c*.

Next, a veneer disclosed in 25*d*, 25*e*, 26*d*, and 26*e*, bonding faces thereof are machined in such a manner that end faces of both end portions thereof are symmetrical about an intersecting point of diagonal lines of an end face which is in parallel to the bonding direction of the veneer, that is, the center of symmetry c.

Figure 25D:
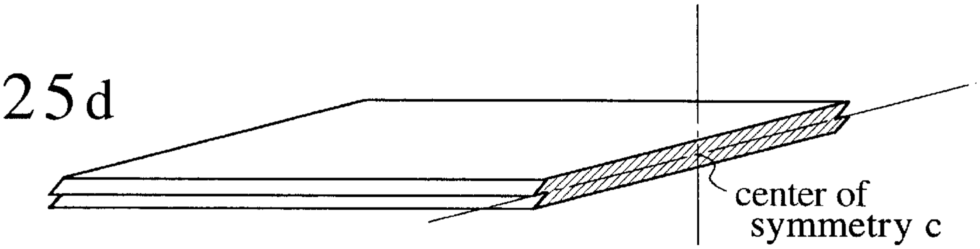
Figure 25E:
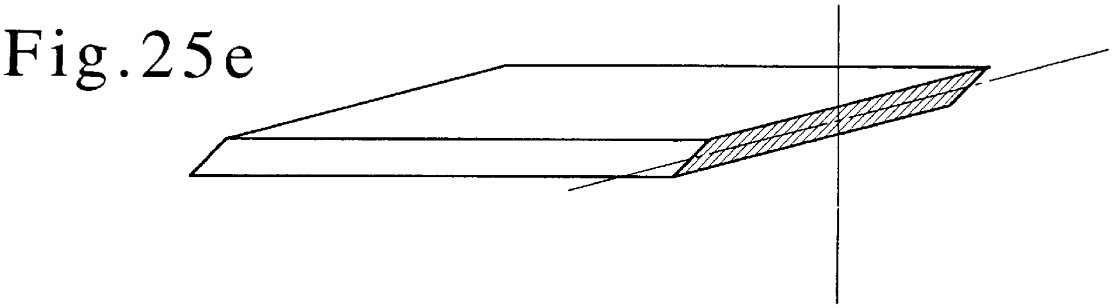

Especially, in case of the bonding face with the shape indicated in FIG. 25*d*, it is effective since machining therefor may be carried out with ease when relatively thick veneers are used.

Further, when the bonding faces are machined so as to have wider surface, it is effective since bonding strength is increased due to wider bonding area.

In this case, it is impossible to use an adjusting method in the above-mentioned two methods in which every other veneers are reversed in a rotating direction e shown by an arrow mark. That is, in this case also, for the same reason as the above, the shapes of the rear end bonding face of a preceding veneer and the front end bonding face of a succeeding veneer do not coincide with each other, which prevents proper bonding between them.

Consequently, for these veneers only, ever other veneers are reversed in a rotating direction d indicated by an arrow mark for proper adjustment.

In this connection, when a veneer with the bonding faces which are machined in the aforementioned manner is adjusted by the above adjusting device and then the veneer is bonded, in addition to the characteristics of the veneer itself, following functions and effect are obtained.

Before explaining the functions and effect, characteristics of wood will be explained.

At first, as for sawn wood, when an undried flat grain board is dried, it is known that since the shrinkage ratio of the face side of the flat grain board is larger than that of the backside thereof, the board is bent with the face side thereof being concaved (hereinafter referred to as "bent toward face side").

Next, in case of a veneer, when cracks are generated on the backside of the veneer when cut out from a log with a veneer lathe or the like, even if the veneer is not dried, the veneer will occasionally be bent toward the outside thereof.

However, when veneers are cut with increased pressing by a nose bar in order to obtain high quality veneers, veneers with little lathe checks cracks on the backside are manufactured. Such veneers occasionally bent toward the backside thereof.

Further, thicker veneers to be cut show the tendency to bend more frequently, and the extent of the tend of the cut veneer becomes more conspicuous as the diameter of the log is smaller.

Then, when those undried veneers are dried, the extent of the bend tends to become more remarkable.

Further, for instance, when the drying is carried out through hot plates, that is, through so-called press dryer, after dried, the veneers become flat. However, after that, the veneer returns to the shape with the original bend as time passes.

The functions and effect of the present invention in combination with the above-mentioned characteristics of veneers themselves will be explained with reference to FIGS. 27 and 28.

Figure 27:
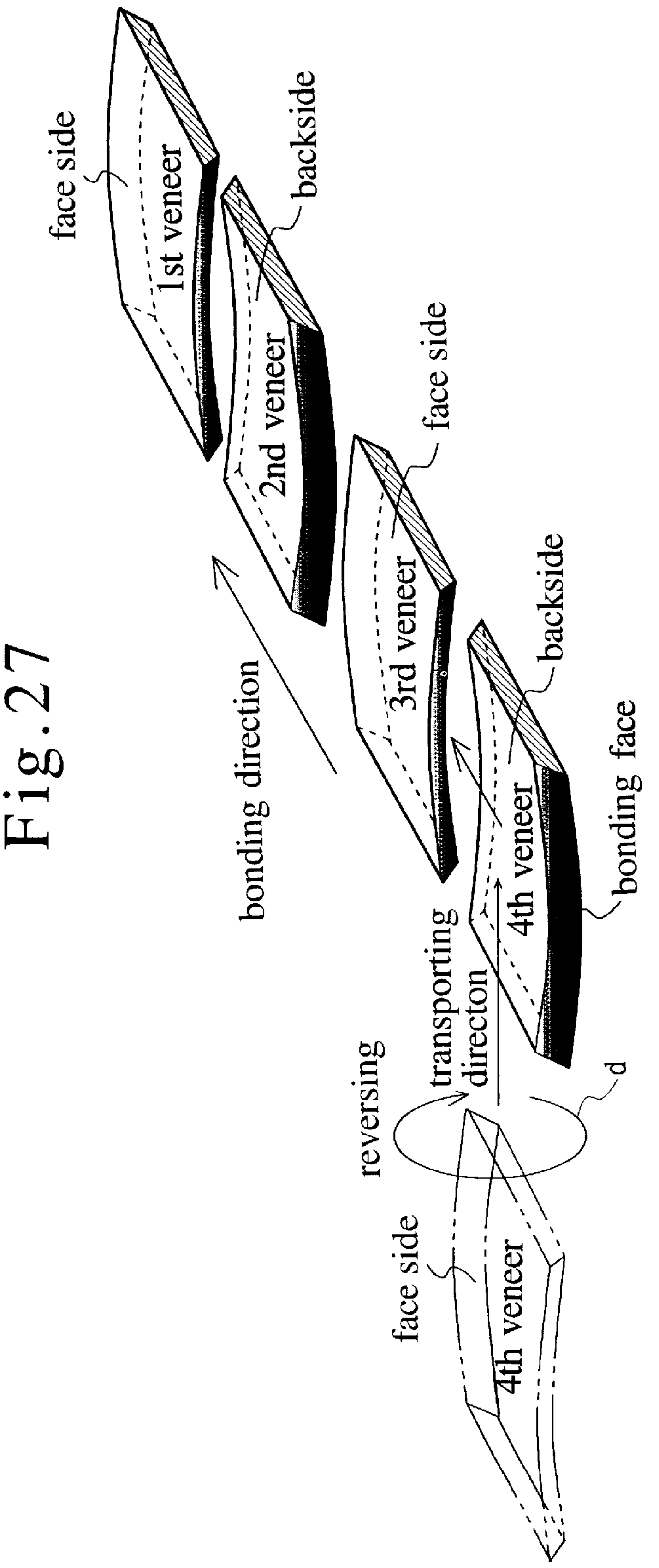
FIG. 27 is a perspective view for explaining a process that the veneers are bonded to each other.

FIG. 27 is a perspective view for explaining a process of bonding veneers, and only a veneer is illustrated to facilitate understanding.

FIG. 28 is a perspective view showing a state that the veneers are adjusted to each other.

Firstly, the veneer shown in FIG. 27 is that illustrated in FIGS. 25*a* and 26*a*, and the veneer is provided with a bonding face which is machined so as to be an isosceles trapezoid, of which lower side coincides with the face side of the veneer, and the shape of the trapezoid is identical with the shape to be symmetrical.

As described above, the veneers to be bonded are adjusted in such a manner that every other veneers are reversed one by one, and in this embodiment, even numbered veneers are reversed.

As a result, the first, the third veneers, and following odd numbered veneers which are fed from the veneer feeding device (not shown) are transported after their transporting direction is converted to a direction perpendicular to the direction in which the veneers are transported, that is, a direction in which the veneers are bonded.

On the other hand, the second veneer and following even numbered veneers are also transported after their transporting direction is converted to a direction perpendicular to the direction that the veneers are transported. However, those veneers are rotated in a direction marked by an arrow d and are reversed in advance for the adjustment to preceding veneers.

Figure 28A:
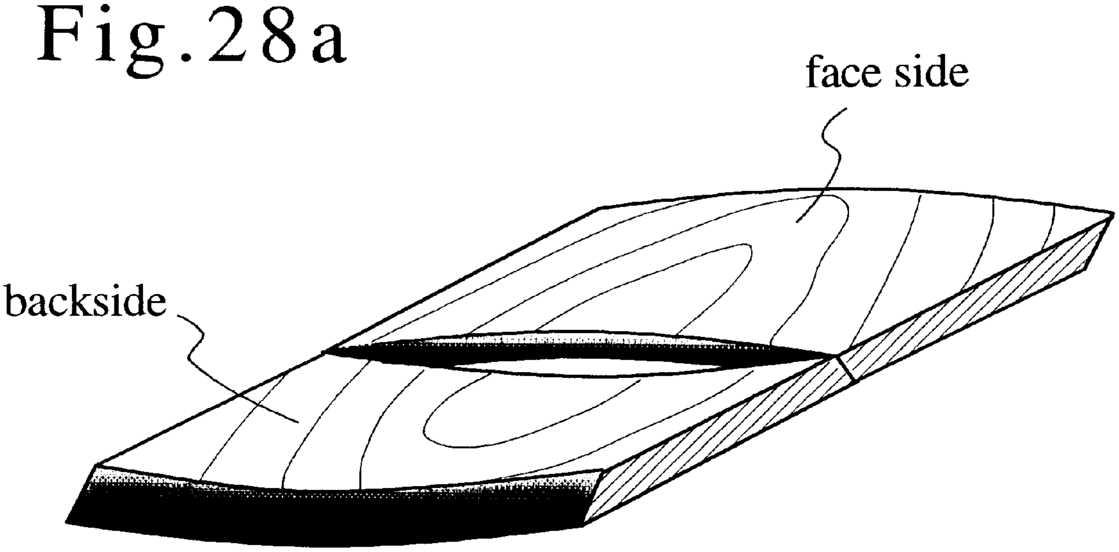
FIGS. 28*a* and 28*b* are perspective views showing a condition that veneers are adjusted.
Figure 28B:
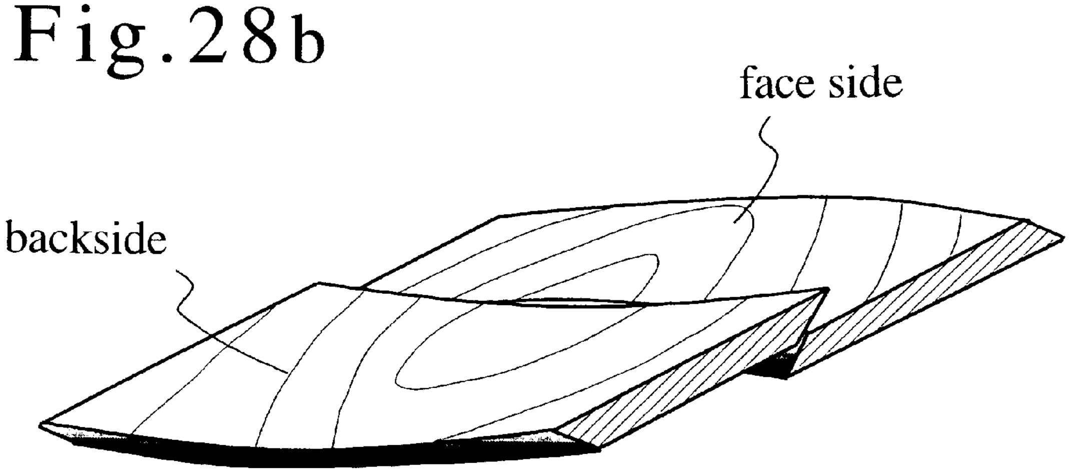

Next, the conditions of the bonding faces after adjusted are shown in FIGS. 28*a* and 28*b*.

FIG. 28*a* shows a state that the veneer disclosed in FIG. 27 is adjusted, and FIG. 28*b* discloses a state that the veneer disclosed in FIGS. 25*b* and 26*b*, that is, the veneer with a bonding face which is machined so as to be an isosceles trapezoid, of which lower side coincides with the face side of the veneer, and the shape of the trapezoid is identical with the shape to be symmetrical.

As clearly understood from FIGS. 28*a* and 28*b*, each veneer is bent toward the backside. Therefore, the veneer is a high quality veneer with little cracks on the backside thereof as described above.

Consequently, after the veneers with the aforementioned bends are adjusted in such a manner that the face side of a veneer and the backside of another veneer are flush with each other, that is, after the veneers are adjusted such that the directions of the bends are reversed, the veneers are pressurized, then the bends of the veneers work negative to each other, which provides functions and effects that flat bonded veneers without disorder can be obtained.

In this connection, in case that the veneers are bonded as illustrated in FIG. 28*a*, as clearly understood from the figure, portions of the bonding faces adjacent to both ends thereof are in contact with each other, however, portions of the bonding faces near the center thereof do not contact with each other, which generates a space. On the other hand, in FIG. 28*b*, the veneer bends toward the backside like the veneer illustrated is provided with FIG. 28*a*. However, portions of the bonding faces adjacent to the center thereof are in contact with each other, and portions of the bonding faces near both ends thereof do not contact with each other, and the both end portions of a veneer rise from the surface of the other veneer.

However, in any case, the overall veneers are easily pressed while being closely contact with each other by the pressurizing device 17 in the following process.

On the contrary, when the pressurizing of the bonding faces by the pressurizing device 17 is canceled, a force causing the bonding faces of the veneers to restore to the state before bonded, that is, the state shown in FIGS. 28*a* and 28*b*, remains in the veneers, so that poor bonding condition between the veneers causes the bonding faces thereof to partially be separated from each other.

Especially, as illustrated in FIG. 28*b*, when the portions of the bonding faces adjacent to the both end portions of a veneer rise from the surface of other veneer before bonding, the separation is liable to occur. On the other hand, in case of FIG. 28*a*, once the veneers are pressed, the separation of the veneers is not relatively likely to occur. That is, it is not easy for the veneers to separate from each other from a portion near the center of the bonding faces.

Therefore, in case that veneers to be bonded have little crack on the backside thereof and bend toward the backside thereof, it is preferable that the veneers are adjusted after the bonding faces of the veneers are machined so as to be an isosceles trapezoid, of which lower side coincides with the face side of the veneer, and the shape of the trapezoid is identical with the shape to be symmetrical, in consideration that the bonding faces are not liable to separate from each other.

In any case, if only the bonding faces are bonded without separation therebetween, the same effect is obtained about disorder of the veneers after bonding.

EXAMPLES

In order to supplement the embodiments of the present invention described above, examples of the present invention will be explained with reference to drawings.

In the examples, unseasoned veneers with a narrow width of about two shaku (about 60 cm) are bonded to each other in a direction of fibers thereof, that is, the bonding along the grain is carried out.

At first, when the narrow unseasoned veneers are bonded to each other, as described above, disorders of each o f the unseasoned veneers work negative to each other, therefore, the method is characterized in that the overall bonded veneers as a product has no disorder after dried.

Further, with the narrow unseasoned veneer, for instance, even if wide veneer can not be cut since the trunk of a log considerably bends, the log is cut into round slices to obtain short logs, and each short log is cut by a veneer race or the like to obtain the narrow unseasoned veneers, which allows bent logs, which could not be used before, to effectively be utilized.

The transportation of veneers by the veneer feeding device 5 illustrated in FIG. 3 is carried out while the face side of the unseasoned veneer is turn upward. This is because the unseasoned veneers cut by a veneer lathe or the like are normally piled with the face side thereof turn upward, therefore, the veneers can be fed to the veneer feeding device 5 from top as they are.

The unseasoned veneer 3 inserted the veneer feeding device 5 is pressurized to the holding surface table 5*j* as the veneer supporting plate 5*c* is elevated, and in case that the is unevenness in the thickness of the veneers to be bonded, and if the veneer supporting plate 5*c* is a rigid body, a partial contact between the unseasoned veneer and the veneer supporting plate 5*c* allows the veneer to be bonded to be pressurized and supported, for instance, there was a problem that the bonding faces are accurately machined due to the shift of the unseasoned veneers when the bonding faces are machined.

Then, an elastic body may be attached to the veneer supporting plate 5*c* to support the unseasoned veneer through the elastic body, which permits the unseasoned veneer to evenly be pressurized and supported by the veneer supporting plate 5*c*, preventing the above-mentioned problem.

Further, although it is not illustrated in figures, the veneer supporting plate 5*c* itself may be divided into a plurality of sections to pressurize and support the uneven veneers through each section of the veneer supporting plate 5*c* to prevent the aforementioned problem.

Further, with the veneer feeding device 5, unlike a conventional transporting method which has generally been utilized, for instance, a method of transporting unseasoned veneers only through belts or rolls, the veneer feeding device 5 itself for supporting and fixing unseasoned veneers are transported for the transportation of the veneers, so that, the unseasoned veneers are transported without loosing the veneer positioning information of the unseasoned veneer 3 against the route stand 5*d*.

Consequently, in the conventional method, wearing of the belt, extension of the belt, slide between the roll and unseasoned veneer, and the like make stable transportation of the veneers difficult, so that the veneer positioning information is liable to be lost.

Further, the veneer transporting device 11 described below also has the same characteristic as the above in that the veneer positioning information of the unseasoned veneer 3 against the rails will not be lost.

With the veneer feeding device 5 with aforementioned construction, in case that the unseasoned veneer to be bonded is a single veneer, as a matter of course even if an unseasoned veneer with partial crack, unseasoned veneers completely split into some pieces, an unseasoned veneer with regular length after irregular veneers are piled, an unseasoned veneer formed by irregular veneers are bonded in a direction perpendicular to a direction of fibers of the veneer, so called an unseasoned veneer formed by so-called lateral bonding are fed, the veneers also securely be supported and transported.

Next the bonding face machining device 7 will be explained with reference to FIG. 3. In this example, the circular saw 7*a* is used to cut bonding faces.

At first, the unseasoned veneer 3 is transported together with the veneer feeding device 5 to the circular saw 7*a*, and the unseasoned veneer 3 passes through the circular saw 7*a* to machine both end portions of the unseasoned veneer into scarf-shaped bonding faces.

In this connection, the circular saw 7*a* is fixed so as to be inclined 30 with respect to horizontal plane, so that the ratio of the thickness of the cut and machined bonding face and the length of an inclined scarf face becomes 1 to 2.

Further, in order to machine the bonding face to have the shape indicated in FIG. 25*a*, a direction in which the circular saw 7*a* rotates is set to be a direction in which a tip of blades thereof enters from the backside of the unseasoned veneer 3 and is allowed to go through out from the face side thereof. So the tip comes out from the face side without forming lathe checks, which prevents chips on the bonding face from being generated. Thus, an accurately machined bonding face results.

In this connection, in the above-mentioned machining of the bonding face results, there is much difference between unseasoned veneers and dried veneers. Therefore, this difference will be explained below.

That is, in case of considerably strong disorder, depending on a degree of the disorder, when the disorder is generated after the veneer is dried, it is not easy to remove the disorder even if the veneer supporting plate 5*c* is elevated to pressurize the veneer to the holding surface table 5*j*.

Therefore, before the veneer with disorder becomes flat, the veneer with uneven surface is machined, so that there will be a problem that the bonding face of the veneer cannot be machined accurately.

Further, especially, a dried thin veneer with disorder is broken at a disordered portion thereof at the pressurization and supporting by the veneer supporting plate 5*c*, which causes bonding accuracy to be lowered.

Dried veneer are subject to the above-mentioned problem. Therefore, logs with little disorder, that is, expensive logs must be used.

From this point of view, when the veneer is machined before dried, the veneer relatively has little disorder, and moreover, the veneer can be machined under the condition that the veneer is not easily broken, resulting in accurate bonding face.

By the way, the shape of the bonding face is not limited to the above-mentioned scarf-shaped bonding face, and the shapes represented in FIGS. 25 and 26 may be used. It is not illustrated in figures, however, a butt joint may be used.

In case of the butt joint, unlike the scarf—shaped bonding face, a clearance is easily made between the bonding faces when pressurized, so that the pressurization is carried after the bonding faces contact to each other to prevent the reduction in bonding strength due to the generation of the clearance also.

In order to improve productivity, in the apparatus shown in FIG. 1, the bonding face machining device 7 and the drying device 9 are closely situated. As a result, while the drying device 9 dries the bonding faces of a preceding unseasoned veneer, a succeeding unseasoned veneer extremely approaches the drying device 9, although it is not illustrated in figures, the transportation of the veneer stops while the bonding faces are machined by a circular saw. However, even if the transportation is ceased during the machining, moisture of the unseasoned veneer prevents the temperatures of the circular saw and the unseasoned veneer from being remarkably increased, scorching on the bonding faces and other problems were not observed.

Although it is not illustrated in figures, in the bonding face machining device 7, the circular saw 7*a* is freely movable in accordance with the width of a bonded unseasoned veneer. Further, the inclination of the circular saw 7*a* is also changeable if occasion may demand.

Next, the drying device 9 will be explained with reference to FIG. 5.

The bonding agent applied to the unseasoned veneer of high water content is diluted, and the viscosity thereof is decreased. Therefore, the bonding agent excessively percolates through the unseasoned veneer with the result that deficiency of bonding agent is generated or the hardening of the bonding agent is delayed.

Therefore, when the bonding faces are bonded to each other, the bonding faces are first dried by the drying device 9, and thermosetting bonding agent was applied to the bonding faces to bond the bonding faces, then an unseasoned veneers were also bonded.

Consequently, if conditions such as drying temperature and drying time for the bonding faces, and the amount and viscosity of bonding agent to be applied are satisfied, unseasoned veneer can be bonded also.

Then, the drying device 9 illustrated in FIG. 5 is provided with a pair of upper and lower hot plates, that is, the flat upper hot plate 9*b* and the lower hot plate 9*a* with an inclined face thereof corresponding the shape of the scarf-shaped bonding face, the bonding faces are dried through the pressuring and heating by the hot plates.

Further, with some shapes of the bonding faces shown in FIG. 25, it may be impossible to dry it through pressurizing and heating by the hot plates from upside and downside thereof. In this case, however, the drying operation is performed through pressurizing and heating from side faces.

Although it is not illustrated in figures, there are other drying methods such as heating with direct flame burner, introducing hot air, and high frequency heating.

After the bonding faces are dried as stated above, when the bonding faces are pressurized and heated in the pressurizing device 17 in the following process, since the wood has low heat conductivity, therefore, it is difficult that the heat is transferred to the central portion of the bonding faces. However, the advanced drying of the bonding faces allows hardening of the bonding agent at the central portion of the bonding faces to be promoted by remaining heat at that time.

Next, the veneer transporting device 11 will be explained with reference to FIGS. 6 and 7.

The veneer transporting device 11 is transported, as illustrated in the figures, to the drying device 9 to transport the unseasoned veneer 3 while the drying device 9 pressurizes and heats the unseasoned veneer 3. Then, after the veneer transporting device 11 nips the unseasoned veneer 3, the drying device 9 releases the pressurizing and heating of the unseasoned veneer 3, so that the unseasoned veneer 3 is transported to the following process without the veneer positioning information .

Next, the bonding agent applying device 13 will be explained. As described above, the speed of the outer peripheral surface of the bonding agent applying roll 13 of the bonding agent applying device 13 is set to be slightly slower than the speed that the unseasoned veneer 3 is transported. As a result, the unseasoned veneer 3 rubs and removes the thermosetting bonding agent which is adhered to the outer peripheral surface of the bonding agent applying roll, so that the amount of bonding agent applied to the bonding faces is stably maintained.

In some shapes of the bonding face, it is impossible to apply bonding agent using bonding agent applying roll 13, however, in such a case, for instance, spray-type applying device may be used.

Next, the method of adjusting unseasoned veneer 3 through adjusting device 15 will be explained with reference to FIGS. 16 to 19.

As described above, the adjusting device 15 is constructed in such a manner as to rotate the even-numbered unseasoned veneer 3 to an arbitrary position about the axis 15*d* of rotation of the connecting shaft 15*b*, therefore, as illustrated in FIG. 16, the unseasoned veneer 3 is rotated clockwise (not shown) by 180°, that is, reversed, and as illustrated in FIG. 17, the veneer transporting device 11 is moved right by the cylinder 11*f*, to permit the front end bonding face of the unseasoned veneer 3 to abut the rear end bonding face of the preceding unseasoned veneer 3 for adjustment.

The unseasoned veneers 3 adjusted as stated above are, as illustrated in FIG. 18, bonded to each other by the pressurizing device 17.

As for other adjusting methods, although it is not illustrated in figures, when even-numbered unseasoned veneers 3 are reversed, the unseasoned veneer 3 is rotated clockwise slightly more than 180°, and then the veneer transporting device 11 may be moved right by the cylinder 11*f* for the adjustment.

More particularly explaining, at first, the unseasoned veneer 3 is rotated clockwise excessively by $\alpha$ in addition to 180°. In this embodiment, the angle $\alpha$ is set to be 5°.

Then, even if the unseasoned veneer 3 which is excessively rotated is transported to the rear end bonding face of the preceding unseasoned veneer 3, the front end bonding face does not contact the rear end bonding face. Therefore, this time, the unseasoned veneer 3 is rotated counterclockwise (returning direction) by $\alpha$, which allows the unseasoned veneer 3 to be adjusted in such a manner that the front end bonding face covers the rear end bonding face.

In case of odd-numbered unseasoned veneers 3, the unseasoned veneer 3 is rotated counterclockwise by $\alpha$, and in this inclined posture, the unseasoned veneer 3 is transported to the rear end bonding face of the preceding unseasoned veneer 3. In this case, like the even-numbered unseasoned veneers 3, the front end bonding face does not contact the rear end bonding face, so that the unseasoned veneer 3 is rotated clockwise (returning direction) by $\alpha$, which allows the unseasoned veneer 3 to be adjusted in such a manner that the front end bonding face covers the rear end bonding face.

The unseasoned veneers 3 adjusted as stated above are, as illustrated in FIG. 18, bonded to each other by the pressurizing device 17.

Next, the pressurizing device 17 will be explained.

After the bonding faces are adjusted to each other, the pressurizing device 17 pressurizes and heats the bonding faces. While, wood has poor thermal conductivity, so that like this embodiment, when heat is applied from the surface of an unseasoned veneer, depending on the thickness of the veneer, the heat is not easily transmitted to the central portion of the bonding faces, it took a considerably long period of time to completely harden the thermosetting bonding agent applied on the bonding face.

Then, in order to finish the heating and pressurizing of the bonding face for a short period of time from view point of productivity, even before the overall bonding face is completely hardened, it is sufficient that the bonded unseasoned veneers are hardened in such a degree that there is no problem in transporting the bonded unseasoned veneers to the following process. Therefore, the heating and pressurizing are ceased when the surface of the bonding face of the unseasoned veneer is hardened.

Then, the central portion of the bonding face which is not yet dried is completely hardened by adding a veneer drying step in the following process.

While, the time for heating and pressurizing is to be determined according to the magnitude of outer force which is applied to the bonding face of the unseasoned veneer in the following process.

That is, for example, a roll dryer or the like is installed in the following process, excessive force may be applied to the bonding faces of the bonded unseasoned veneers by the roll during transportation, so that in this case, the time for heating and pressurizing must be set longer to increase the strength of the bonding faces. Otherwise, when hot-plate-type drying device is mounted in the following process, relatively, excessive force is not applied to the bonding faces. It is, therefore, sufficient that the bonding strength enough to bear the transportation to the drying device, thus, the time for heating and pressurizing being shortened.

By the way, the upper and lower hot plates of the pressurizing device 17 in the present embodiment have flat surfaces. However, convex shaped hot plates may be used to concentratedly pressurize and heat the bonding faces.

Next, the bonded veneers transporting device 19 will be explained. When the bonded veneers transporting device 19 transports the rear end bonding faces of the train 30 of bonded veneers to the bonding position of the pressurizing device 17 to prepare for the adjustment to the front end bonding faces of the succeeding unseasoned veneers, the bonded veneers transporting device 19 is moved after the fixing and supporting of the bonding faces by the lower bonded veneers supporting plate 19*a* and the upper bonded veneers supporting plate 11*b* as illustrated in FIG. 21.

By the way, although concrete explanation was omitted in this embodiment, they are heated and pressed again at that time, by providing a heat source for the lower bonded veneers supporting plate 19*a* and the upper bonded veneers supporting plate 19*b* to use those plates as heated bodies, as illustrated in FIG. 21, when the bonding faces are fixed and supported, thus, hardening again the bonding agent which is not yet hardened in the preceding process and resulting in increased bonding strength of the bonding faces.

Consequently, even if the time for heating and pressurizing is further shortened in preceding process, as described above, the bonding faces can be healed and pressed in succeeding process again to harden the bonding agent, resulting in improved productivity.

Next, the regular cutting device 21 will be explained. In this embodiment, the regular cutting device 21 is mounted to the bonded veneers transporting device 19, so that even when the group 30 of bonded veneers stop, the bonded veneers transporting device 19 is moved to the regular cutting position to regularly cut the bonded veneers at a proper position.

Therefore, it is unnecessary to stop the transportation of the train 30 of bonded veneers only for regular cutting, resulting in improved productivity.

As described above, although the examples are supplementarily explained, the present invention is not limited to the bonding of the unseasoned veneers along the grain as described above, and the present intention may be applied to the bonding of the unseasoned veneers and the dried veneers across the grain.

In case of the lateral bonding across the grain, disorder which is generated along the direction of fibers of bonded veneers acts to cancel each other with the result that, disorder on the bonded veneers is not easily generated like the bonding along the grain.

Therefore, in both bonding along the grain and across the grain, a bonded veneers train which are obtained to alternately bond the face sides and backsides become products with little disorder as a whole.

[Effect of the Invention]

With the constructions of the present invention described above, following effects are provided.

Firstly, after the both end portions of each of the veneer to be bonded are machined to the bonding faces, bonding agent are applied to the bonding faces, then the veneers are adjusted such that the face side of one veneer to be bonded and the backside of the other veneer to be bonded are flush with each other, and then those bonding faces are pressurized, so that if each veneer to be bonded is disordered, the disorders of the veneers work negative to each other, bonded veneers are not easily subject to disorder.

With the above-mentioned construction, regardless of seasoning of the veneers to be bonded, the same effect will be obtained.

Further, when the unseasoned veneers are bonded to each other, the both end portions of the unseasoned veneers are machined to bonding faces and the bonding faces are dried, and thermosetting bonding agent is applied to the bonding faces, and then the bonding faces are heated and pressurized such that the face side of one unseasoned veneer to be bonded and the backside of the other unseasoned veneer to be bonded are flush with each other, which considerably improves workability, productivity, and bonding strength in comparison to a conventional bonding method humidity-setting type bonding agent with or the like.

Especially, with the present inventions, The veneer nipped by the veneer feeding device once is always separately nipped by the following device at the delivery to the following device while a device in the preceding process nipping the veneer, therefore, the veneers are transported to the following process without loosing the veneer positioning information in the previous process, which permits accurate processing in each process described above, resulting in high quality bonded veneers.

Further, with the present invention, unlike the conventional method, it is unnecessary to prepare in advance a veneer, corresponding to the first veneer to be fed, and to make the veneer to stand by, and the first veneer fed to the apparatus is automatically transported to the bonding position to prepare for the bonding to the succeeding veneer.

As a result, in case that the dimensions, thickness, and kinds of veneers to be bonded are required to must be changed, the method according to the present invention can quickly accommodate the change, resulting in improved productivity and increased yield rate.

Further, with the present invention, a machining method of each of the veneers to be bonded is selectable in accordance with direction of bending, material, thickness and degree of disorder of the veneer to be bonded, which provides improved bonding accuracy and bonding strength.

What is claimed is:

1. A veneer bonding apparatus for bonding veneers to each other, wherein each of said veneers has two opposed sides called backside and face side, respectively, and said veneers tend to bend toward the same side, comprising:

a bonding face machining device for machining both end portions of a veneer to be bonded to bonding faces;

a bonding agent applying device for applying bonding agent to at least one bonding face of said machined bonding faces;

an adjusting device for adjusting a front end bonding face, with the bonding agent applied thereto, of a succeeding veneer to a rear end bonding face, with the bonding agent applied thereto, of a preceding veneer such that the face side of said preceding veneer and the backside of said succeeding veneer are flush with each other; and a pressurizing device for pressurizing said adjusted bonding faces to each other.

2. An unseasoned veneer bonding apparatus for bonding veneers to each other, wherein each of said veneers has two opposed sides called backside and face side, respectively, and said veneers tend to bend toward the same side, comprising:

a bonding face machining device for machining both end portions of an unseasoned veneer to be bonded to bonding faces;

a drying device for drying said machined bonding faces;

a bonding agent applying device for applying thermosetting bonding agent to at least one bonding face of said dried bonding faces;

an adjusting device for adjusting a front end bonding face, with the thermosetting bonding agent applied thereto, of a succeeding unseasoned veneer to a rear end bonding face, with the thermosetting bonding agent applied thereto, of a preceding unseasoned veneer such that the face side of said preceding unseasoned veneer and the backside of said succeeding unseasoned veneer are flush with each other; and a pressurizing device for heating and pressurizing said adjusted bonding faces to each other.

3. A veneer bonding apparatus for bonding veneers to each other, wherein each of said veneers has two opposed sides called backside and face side, respectively, and said veneers tend to bend toward the same side, comprising:

a veneer feeding device for feeding a veneer to be bonded to a following process while nipping said veneer;

a bonding face machining device for machining both end portions of said veneer to bonding faces after said veneer feeding device nips the veneer;

a veneer transporting device for independently nipping the veneer of which both ends are machined to the bonding faces while the veneer is nipped by the veneer feeding device, and after the nipping of the veneer by the veneer feeding device is released, said veneer transporting device transporting the veneer while nipping the veneer;

a bonding agent applying device for applying bonding agent to at least one bonding face of said machined bonding faces;

an adjusting device for adjusting a front end bonding face, with the bonding agent applied thereto, of a succeeding veneer to a rear end bonding face, with the bonding agent applied thereto, of a preceding veneer such that the face side of said preceding veneer and the backside of said succeeding veneer are flush with each other;

a pressurizing device for pressurizing said adjusted bonding faces to each other; and a bonded veneers transporting device for nipping a train of said bonded veneers, and for transporting said rear end bonding faces of the train of the bonded veneers to a bonding position of the pressurizing device to prepare for bonding to said front bonding faces of said succeeding veneers after said pressurizing device releases the nipping of said train of the bonded veneers.

4. A veneer bonding apparatus for bonding unseasoned veneers to each other, wherein each of said veneers has two opposed sides called backside and face side, respectively, and said veneers tend to bend toward the same side, comprising:

a veneer feeding device for feeding an unseasoned veneer to be bonded to a drying device in a following process while nipping said veneer;

a bonding face machining device for machining both end portions of said unseasoned veneer to bonding faces after said veneer feeding device nips the unseasoned veneer;

a drying device for independently nipping said unseasoned veneer and drying said machined bonding faces while said unseasoned veneer of which both ends are machined to bonding faces is nipped by said veneer feeding device;

a veneer transporting device for independently nipping said unseasoned veneer while the veneer is nipped at least by the drying device, and after the nipping of the unseasoned veneer by the veneer feeding device and by the drying device are released, said veneer transporting device transporting the unseasoned veneer while nipping the unseasoned veneer;

a bonding agent applying device for applying thermosetting bonding agent to at least one bonding face of said dried bonding faces;

an adjusting device for adjusting a front end bonding face, with the thermosetting bonding agent applied thereto, of a succeeding veneer to a rear end bonding face, with the thermosetting bonding agent applied thereto, of a preceding veneer such that the face side of said preceding veneer and the backside of said succeeding veneer are flush with each other;

a pressurizing device for pressurizing said adjusted bonding faces to each other; and a bonded veneers transporting device for nipping a train of said bonded unseasoned veneers, and for transporting said rear end bonding faces of the train of the bonded unseasoned veneers to a bonding position of the pressurizing device to prepare for bonding to said front bonding faces of said succeeding unseasoned veneers after said pressurizing device releases the nipping of said train of the bonded unseasoned veneers.

5. A method of transporting, with said veneer bonding apparatus as claimed in claim 3, a first veneer when veneers with substantially constant thickness in a direction that said veneers are bonded, comprising the steps of:

machining both end portions of said veneer to bonding faces with said veneer nipped by the veneer feeding device;

independently nipping the veneer of which both ends are machined to the bonding faces by said veneer transporting device while the veneer is nipped by the veneer feeding device, and after the nipping of the veneer by the veneer feeding device is released, said veneer transporting device transporting the veneer while nipping the veneer;

pressurizing a portion of a front end bonding face by the pressurizing device when said front bonding face of the veneer is transported to a bonding position of the pressurizing device;

releasing the nipping of the veneer by the veneer transporting device, and after retreating a predetermined distance said veneer transporting device nipping the veneer again;

transporting the front end bonding face by the veneer transporting device to a position where the bonded veneers transporting device is capable of nipping the front bonding face when said pressurizing device releases the nipping of the veneer; and transporting the rear end bonding face of the veneer by the bonded veneers transporting device while nipping the veneers to a bonding position of the pressurizing device to prepare for a bonding to the front end bonding face of a succeeding veneer when the veneer transporting device releases the nipping of the veneer after the bonded veneers transporting device nips the veneers.

6. The method of transporting a first veneer as claimed in claim 5, wherein the veneers have a substantially constant thickness in a direction in which said veneers are bonded, further comprising the step of applying bonding agent, by said bonding agent applying device, only to a rear bonding face of the machined bonding faces.

7. A method of transporting, with said veneer bonding apparatus as claimed in claim 4, a first veneer when veneers with substantially constant thickness in a direction that said veneers are bonded, comprising the steps of:

machining both end portions of said unseasoned veneer to bonding faces with said unseasoned veneer nipped by the veneer feeding device;

independently nipping the unseasoned veneer of which both ends are machined to the bonding faces by said drying device while the veneer is nipped by the veneer feeding device;

independently nipping the unseasoned veneer by the veneer transporting device while the unseasoned veneer is nipped at least by the drying device;

transporting the unseasoned veneer while nipping the unseasoned veneer after the nippings of the veneer by the veneer feeding device and by the drying device are released, pressurizing a portion of a front end bonding face by the pressurizing device when said front bonding face of the unseasoned veneer is transported to a bonding position of the pressurizing device;

releasing the nipping of the unseasoned veneer by the veneer transporting device, and after retreating a predetermined distance said veneer transporting device nipping the unseasoned veneer again;

transporting the front end bonding face by the veneer transporting device to a position where the bonded veneers transporting device is capable of nipping the front bonding face when said pressurizing device releases the nipping of the unseasoned veneer; and transporting the rear end bonding face of the unseasoned veneer by the bonded veneers transporting device while nipping the veneers to a bonding position of the pressurizing device to prepare for a bonding to the front end bonding face of a succeeding veneer when the veneer transporting device releases the nipping of the veneer after the bonded veneers transporting device nips the unseasoned veneers.

8. The method of transporting a first veneer as claimed in claim 7, wherein the unseasoned veneers have a substantially constant thickness in a direction in which said unseasoned veneers are bonded, further comprising the step of applying a thermosetting bonding agent, by said bonding agent applying device, only to a rear bonding face of the machined bonding faces.

9. A method of bonding veneers, wherein each of said veneers has two opposed sides called backside and face side, respectively, and said veneers tend to bend toward the same side, comprising the steps of:

machining both end portions of each of said veneers to bonding faces;

applying bonding agent to at least one bonding face of said bonding faces;

adjusting said bonding faces such that the face side of a veneer to be bonded and the backside of the other veneer to be bonded are flush with each other; and pressurizing said adjusted bonding faces to each other to bond said veneers to each other.

10. The method of bonding veneers as claimed in claim 9, wherein said veneers to be bonded are unseasoned veneers.

11. A method of bonding veneers, wherein each of said veneers has two opposed sides called backside and face side, respectively, and said veneers lend to bend toward the same side, comprising the steps of:

machining both end portions of each of said unseasoned veneers to bonding faces;

drying said bonding faces and applying thermosetting bonding agent to at least one bonding face of said dried bonding faces;

adjusting said bonding faces of the unseasoned veneer such that the face side of an unseasoned veneer to be bonded and the backside of the other unseasoned veneer to be bonded are flush with each other; and heating and pressurizing said adjusted bonding faces to each other to bond said unseasoned veneers to each other.

12. The method of bonding veneers as claimed in one of claims 9 to 11, wherein both end portions of each of said each veneer are machined such that shapes of end faces are symmetrical about a straight line in a direction of the thickness of the veneer which passes through centers of parallel sides of said end face which is in parallel to a direction that the veneer is bonded.

13. The method of bonding veneers as claimed in claim 12, wherein said shape to be symmetrical is an isosceles trapezoid of which lower side is on the face side of the veneer.

14. The method of bonding veneers as claimed in claim 12, wherein said shape to be symmetrical is an isosceles trapezoid of which lower side is on the backside of the veneer.

15. The method of bonding veneers as claimed in one of claims 9 to 11, wherein both end portions of said each veneer to be bonded are machined such that shapes of end faces are symmetrical about a straight line perpendicular to a direction of the thickness of the veneer which passes through a center of a line connecting centers of parallel sides of said end face which is in parallel to a direction that the veneer is bonded.

16. A method of bonding veneers as claimed in one of claims 9 to 11, wherein both end portions of said each veneer to be bonded are machined such that shapes of end faces are symmetrical about an intersecting point of diagonal lines of an end face which is in parallel to the bonding direction of the veneer.

17. The method of bonding veneers as claimed in claim 16, wherein said shape to be symmetrical is a parallelogram.

* * * * *